(12) United States Patent
Tanaka et al.

(10) Patent No.: US 10,509,508 B2
(45) Date of Patent: Dec. 17, 2019

(54) TOUCH DETECTION CIRCUIT, TOUCH DETECTION PROGRAM AND TOUCH DETECTION METHOD

(71) Applicant: Synaptics Incorporated, San Jose, CA (US)

(72) Inventors: Nobukazu Tanaka, Tokyo (JP); Takayuki Noto, Tokyo (JP); Tetsuo Tanemura, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 159 days.

(21) Appl. No.: 15/673,358

(22) Filed: Aug. 9, 2017

(65) Prior Publication Data

US 2018/0074641 A1    Mar. 15, 2018

(30) Foreign Application Priority Data

Aug. 10, 2016   (JP) .................................. 2016-157096

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| 2010/0295715 | A1 | 11/2010 | Sornin et al. |
| 2012/0229419 | A1* | 9/2012 | Schwartz .............. G06F 3/0418 345/174 |
| 2014/0146010 | A1 | 5/2014 | Akai et al. |
| 2014/0327644 | A1* | 11/2014 | Mohindra ............... G06F 3/044 345/174 |

* cited by examiner

*Primary Examiner* — Amare Mengistu
*Assistant Examiner* — Sarvesh J Nadkarni
(74) *Attorney, Agent, or Firm* — Patterson + Sheridan, LLP

(57) ABSTRACT

Provided is a touch sensing circuit configured to sense an approach of a conductive object toward a sensor capacitor through measuring a sensor response signal generated by the sensor capacitor in response to a sensing wave signal applied to the sensor capacitor. The touch sensing circuit is connectable to a conversion circuit and a touch detection circuit. The conversion circuit calculates a response signal vector for a frequency component of the sensing wave signal by converting the response signal into a frequency domain representation. The touch sensing circuit includes a baseline vector manager circuit holding a baseline vector and a vector subtraction circuit, and calculates a delta vector which is the vector difference between the baseline vector and the response signal vector received from the conversion circuit. The touch detection circuit detects an approach of a conductive object towards the sensor capacitor on the basis of the calculated delta vector.

20 Claims, 17 Drawing Sheets

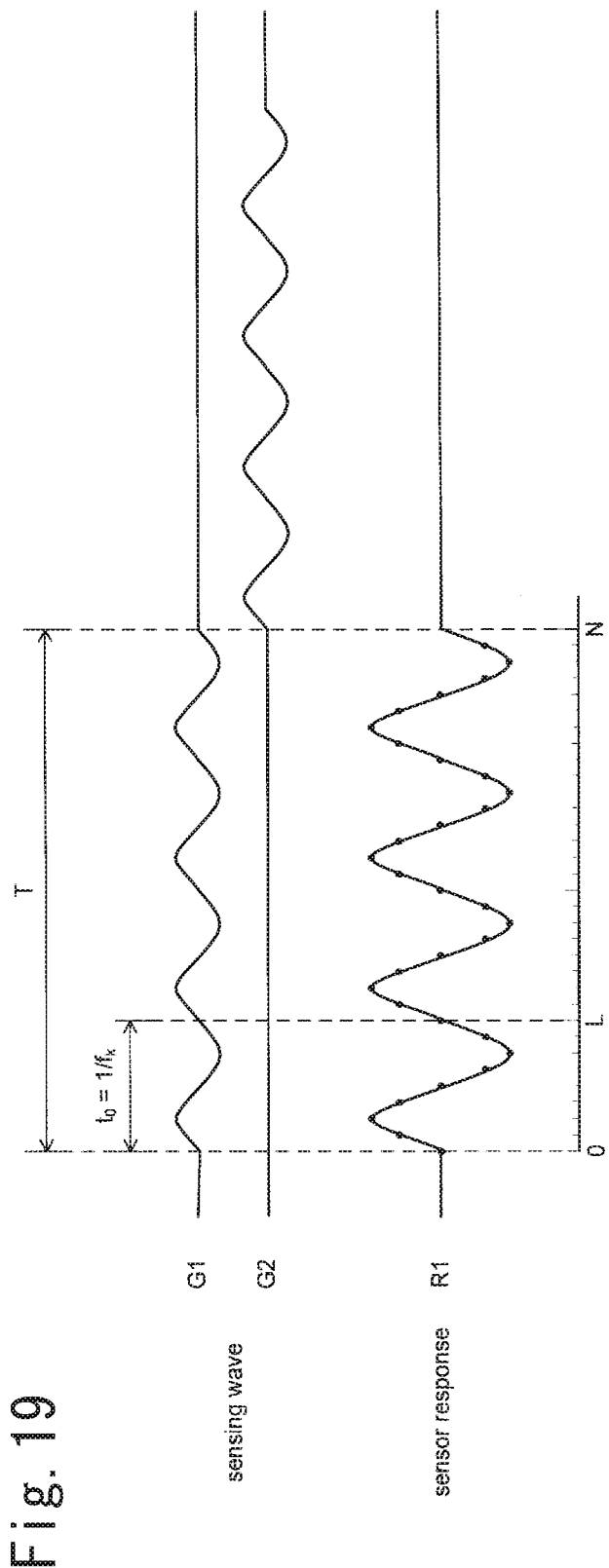

TOUCH DETECTION CIRCUIT, TOUCH DETECTION PROGRAM AND TOUCH DETECTION METHOD

CROSS REFERENCE

This application claims priority of Japanese Patent Application No. 2016-157096, filed on Aug. 10, 2016, the disclosure of which is incorporated herein by reference.

TECHNICAL FIELD

The present disclosure is related to a touch detection (or sensing) circuit, touch detection program, touch detection method and, more particularly, to a technique that can be used for touch sensing to sense an approach of a conductive object toward a sensor capacitor.

BACKGROUND ART

There are known two types of capacitive tough sensing technologies: self-capacitance touch sensing and mutual capacitance touch sensing. In both technologies, touch sensing involves charging and discharging a sensor capacitor having a capacitance which varies depending on touching, by applying a given sensing wave signal; receiving a response signal from the sensor capacitor generated in response to the sensing wave signal; and measuring the magnitude of the response signal. In connection with this, techniques have been variously proposed for improving the sensitivity of touch sensing.

For example, Japanese Patent Application Publication No. 2014-106864 A discloses a touch sensing circuit adapted to mutual capacitance touch sensing. In this technique, a rectangular wave signal is used as the sensing wave signal. This technique improves the touch sensing sensitivity by integrating the response signal corresponding to the rising edges of the sensing wave signal and the response signal corresponding to the falling edges with the polarities inverted from each other.

However, there is room for improving the S/N (signal to noise) ratio of the response signal.

SUMMARY

Therefore, an objective of the present disclosure is to improve the S/N ratio of the response signal.

Those skilled in the art would understand other objectives and new features from the disclosure of the Specification and the attached drawings.

Provided in one embodiment is a touch sensing circuit configured to sense an approach of a conductive object toward a sensor capacitor through measuring a sensor response signal generated by the sensor capacitor in response to a sensing wave signal applied to the sensor capacitor. The touch sensing circuit is connectable to a conversion circuit and a touch detection circuit, and configured as follows:

The conversion circuit calculates a response signal vector for a frequency component of the sensing wave signal by converting the response signal into a frequency domain representation. The touch sensing circuit includes a baseline vector manager circuit holding a baseline vector and a vector subtraction circuit, and calculates a delta vector which is the vector difference between the baseline vector and the response signal vector received from the conversion circuit.

The touch detection circuit detects an approach of a conductive object towards the sensor capacitor on the basis of the calculated delta vector.

This effectively improves the S/N ratio of the response signal.

BRIEF DESCRIPTION OF THE DRAWINGS

FIG. 19 is an illustration illustrating an operation of a conversion circuit (touch AFE) integrated in a touch sensing circuit in one embodiment.

DETAILED DESCRIPTION

The invention will be now described herein with reference to illustrative embodiments. Those skilled in the art would recognize that many alternative embodiments can be accomplished using the teachings of the present invention and that the invention is not limited to the embodiments illustrated for explanatory purposed.

An issue exists in the technique disclosed in Japanese Patent Application Publication No. 2014-106864 A. When a rectangular wave signal is used as the sensing wave signal in the technique disclosed in the above-referenced patent document (Japanese Patent Application Publication No. 2014-106864 A), it is possible to provide a sufficient margin in the timing at which the polarity of the response signal is inverted. When a sine wave signal or a triangular wave signal is used as the sensing wave signal, however, this may cause an insufficient margin in the timing at which the polarity of the response signal is inverted. This may result in that the positive-side response signal is erroneously integrated as the negative-side response signal or the negative-side response signal is erroneously integrated as the positive-side response signal, which may cause deterioration in the sensitivity of touch sensing. In other words, this causes a problem that a phase noise component superposed on the response signal may deteriorate the sensitivity of the touch sensing.

One design to address this problem may be to suppress the contribution of the phase noise component with respect to the amplitude component of the response signal by decreasing the frequency of the sensing wave signal so that the variations in the phase of the response signal are sufficiently suppressed, that is, to restrict the frequency region to achieve the target S/N (signal to noise) ratio.

One solution provides effectively improves the S/N ratio and enhances the sensitivity of touch sensing, which involves performing a Fourier transform on the response signal to extract the amplitude component separately from the phase component. This solution is pursued by U.S. patent application Ser. No. 15/467,332, filed on Mar. 23, 2017, the disclosure of which is incorporated herein by reference.

Figure 1:
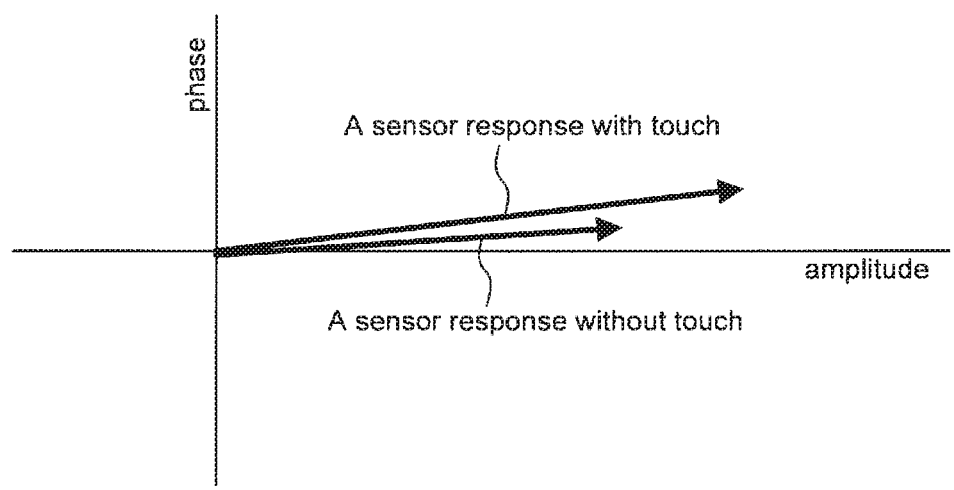
FIG. 1 is a vector diagram illustrating frequency domain representations of response signals used for touch sensing.

One issue with the above approach is discussed in the following:

FIG. 1 is a vector diagram illustrating response signals (sensor responses) used for touch sensing, depicted in a frequency domain representation. The response signal can be represented in the frequency domain as a vector in a two-dimension space, in which one of the two axes (a real number and an imaginary number axis) represents the amplitude and the other represents the phase. As illustrated in FIG. 1, both the amplitude and the phase vary depending on occurrence of touching onto the sensor capacitor.

Figure 2:
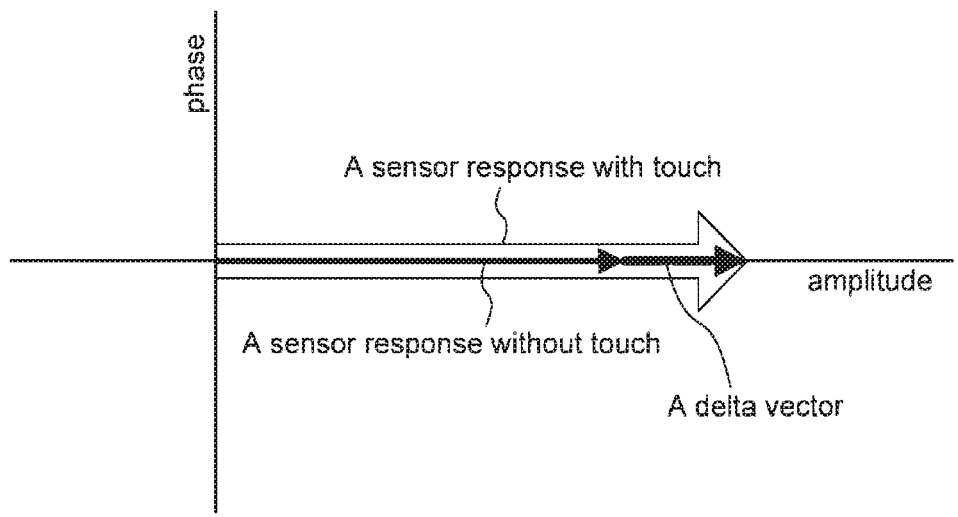
FIG. 2 is a vector diagram illustrating response signal vectors and a delta vector.

FIG. 2 is a vector diagram illustrating response signal vectors and a delta vector (vector difference). When there is no difference in the phase between the response signal vector for the case when touching occurs on the sensor capacitor and that for the case when no touching occurs, the difference in the amplitude accounts for the vector difference and represents the signal component for touch sensing. This corresponds to touch sensing based on scalar values. In this approach, which is based on an assumption that the phase does not vary, the frequency of the sensing wave signal is restricted so that phase variations do not occur or are sufficiently suppressed to ignorable levels. In FIG. 2, the response signal vector with touch and that without touch are illustrated as being superposed each other, and the response signal vector with touch is represented as a wide outline arrow to distinguish the two vectors.

Figure 3:
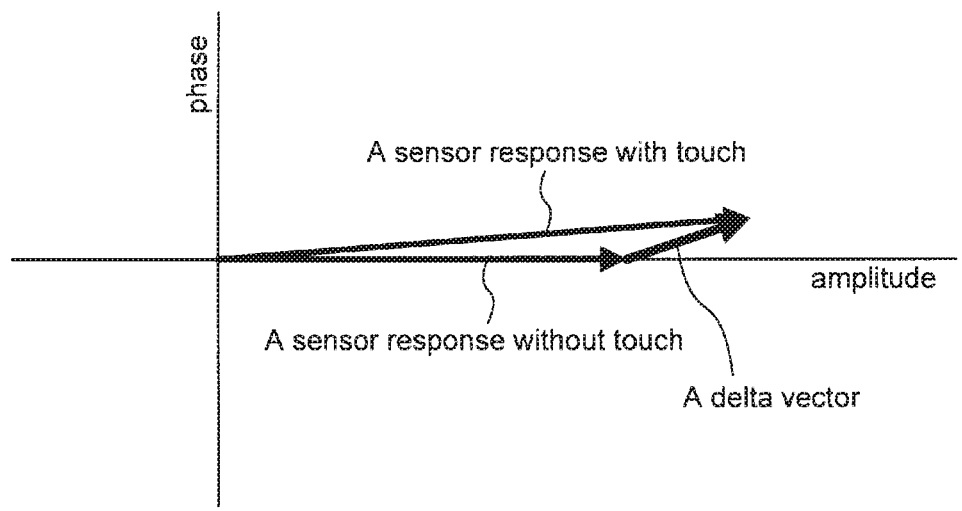
FIG. 3 is a vector diagram illustrating response signal vectors and the delta vector when the frequency of the sensing wave signal is low.

FIG. 3 is a vector diagram illustrating the response signal vectors and the vector difference when the frequency of the sensing wave signal is low. When the frequency of the sensing wave signal is low, the difference in the amplitude between the two vectors accounts for the vector difference. In this case, touch sensing can be achieved by using the difference in the amplitude.

Figure 4:
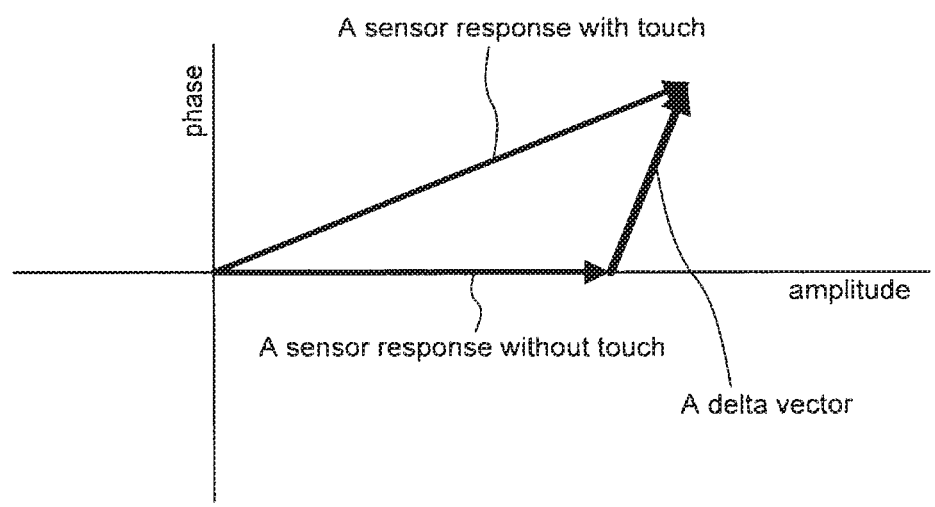
FIG. 4 is a vector diagram illustrating response signal vectors and the delta vector when the frequency of the sensing wave signal is high.

FIG. 4 is a vector diagram illustrating the response signal vectors and the vector difference when the frequency of the sensing wave signal is high. When the frequency of the sensing wave signal is high, the difference in the phase between the two vectors is increased, and the difference in the amplitude component do not sufficiently account for the vector difference.

The entire of the vector difference should be considered as the signal component, since both of the amplitude and phase vary depending on occurrence of touching on the sensor capacitor. If only the amplitude component is extracted to achieve touch sensing, the variations in the phase component are ignored and this leads to a decrease in the signal component. This deteriorates the S/N ratio.

In the following, various embodiments to improve the S/N ratio will be presented.

1. Overview of Embodiments

A description is first given of an overview of representative embodiments disclosed in this application. In the overview given below, reference numerals are recited in parentheses to indicate examples of components corresponding to elements with which the reference numerals are attached.

[1] Baseline Manager and Vector Subtraction Circuit

Provided in one embodiment is a touch sensing circuit configured to sense an approach of a conductive object toward a sensor capacitor ($C_B$) through measuring a response signal (sensor response) generated by the sensor capacitor in response to a sensing wave signal applied to the sensor capacitor. The touch sensing circuit is configured as follows:

The touch sensing circuit is configured to be connected to a conversion circuit (1) and a touch detection circuit (5).

The conversion circuit calculates a response signal vector (S=(Sx0, Sx1)) for a frequency component of the sensing wave signal by converting the response signal into a frequency domain representation.

The touch sensing circuit includes a baseline vector manager circuit (2) holding a baseline vector (B=(Bx0, Bx1)) and a vector subtraction circuit (3) configured to calculate a delta vector (D=(Dx0, Dx1)) which is the vector difference between the baseline vector and the response signal vector received from the conversion circuit.

The touch detection circuit detects an approach of a conductive object towards the sensor capacitor on the basis of the calculated delta vector.

This improves the S/N ratio of the sensor response signal, enhancing the sensitivity of touch sensing.

[2] Use of Demultiplexer

In connection with item [1], the touch sensing circuit may further include a demultiplexer (4) which supplies a selected one of the response signal vector and the delta vector to the touch detection circuit.

This allows performing touch sensing based on the response signal vector when the baseline vector is not yet generated or when the baseline vector is temporarily made unsuitable for touch sensing.

[3] Use of Magnitude Calculation Circuits and Demultiplexer

In connection with item [1], the touch sensing circuit may further include a first magnitude calculation circuit (6) configured to calculate a response signal scalar value corresponding to the magnitude of the response signal vector, a second magnitude calculation circuit (7) configured to calculate a signal difference scalar value corresponding to the magnitude of the delta vector, and a demultiplexer (4) configured to supply a selected one of the response signal scalar value and the signal difference scalar value to the touch detection circuit.

This effectively reduces the amount of data to be supplied to the touch detection circuit. This also allows use of a conventional touch detection circuit configured to use the amplitude component of the response signal for touch sensing, without using the phase component. Also in this case, the S/N ratio can be effectively improved even when such a conventional touch detection circuit is used, because the data supplied to the touch detection circuit, which includes the scalar value of the vector difference, already incorporates information of the phase component of the sensor response signal.

[4] Touch Sensing Scheme

In connection with item [1], the touch detection circuit may hold a baseline vector area data indicating a baseline vector area in a two-dimensional space in which the frequency domain representation is defined and a touch sensed area data indicating a touch sensed area in the two-dimensional space. In this case, the touch detection circuit determines that the conductive object approaches the sensor capacitor when the end point of the delta vector is positioned in the touch sensed area in the two-dimensional space with the initial point of the delta vector defined at a position corresponding to the baseline vector in the baseline vector area.

This allows achieving touch sensing with a simple circuit configuration.

[5] Touch Sensed Area

In connection with item [4], when the baseline vector area is defined as a circular area, the touch sensed area may be defined with a range of a radius from the center of the baseline vector area and a range of an azimuth from a reference direction defined in the two-dimensional space.

This allows achieving touch sensing with a further simple circuit configuration.

[6] Frequency of Sensing Wave Signal

In connection with any of items [1] to [5], the touch sensing circuit further includes a sensing wave signal drive circuit (101) configured to supply the sensing wave signal. The fundamental frequency ($f_k$) of the sensing wave signal is higher than the inverse number of three times of a charging and discharging time constant (e.g., $1/(3 \times R_B \cdot C_B)$) of the sensor capacitor.

This allows further improving the S/N ratio. This is because the fundamental frequency of the sensing wave signal is set to be in a frequency region higher than a frequency region in which noise level resulting from the environment is high, which effectively suppresses the noise level. Although the phase component of the response signal is increased when the frequency of the sensing wave signal is increased, the signal component determining the S/N ratio is not decreased, since a vector incorporating information of both of the amplitude and phase components is used as the signal component. This means that the S/N ratio is further improved.

[7] Touch Controller IC

In connection with any of items [1] to [6], the touch sensing circuit may be integrated within the same semiconductor substrate as the conversion circuit.

This allows providing a touch controller IC with high touch sensitivity.

[8] Touch Controller IC Incorporating Touch Detection Circuit

In connection with item [7], the touch detection circuit may be also integrated within the same semiconductor substrate.

This allows providing a touch controller IC with high touch sensitivity and high integration.

[9] Storage Medium Storing Touch Sensing Program

In another embodiment, a non-transitory tangible storage medium stores therein a touch sensing program used to sense an approach of a conductive object towards a sensor capacitor ($C_B$) on the basis of a response signal (sensor response) generated by the sensor capacitor in response to a sensing wave signal applied to the sensor capacitor. The touch sensing program when executed causes a processor (401) to implement a process including:

a reception step of receiving a response signal vector (S=(Sx0, Sx1)) obtained for a frequency component of the sensing wave signal by converting the response signal into a frequency domain representation;

a delta vector calculation step of calculating a delta vector (D=(Dx0, Dx1)) by performing subtraction (3) between the response signal vector and a baseline vector (B=(Bx0, Bx1)); and a touch detection step (5) of detecting an approach of a conductive object towards the sensor capacitor on the basis of the delta vector.

This improves the S/N ratio of the sensor response signal, enhancing the sensitivity of touch sensing.

[10] Selection of Vectors

In connection with item [9], the touch detection step may include: selecting one of the delta vector and the response signal vector; and detecting the approach of the conductive object towards the sensor capacitor on the basis of the selected one of the delta vector and the response signal vector.

This allows performing touch sensing based on the response signal vector when the baseline vector is not yet generated or when the baseline vector is temporarily made unsuitable for touch sensing.

[11] Use of Magnitude Calculation Circuits and Selection of Scalar Values

In connection with item [9], the touch sensing program may further cause the processor to perform the following steps of:

calculating (6) a response signal scalar value corresponding to the magnitude of the response signal vector;

calculating (7) a signal difference scalar value corresponding to the magnitude of the delta vector; and selecting (4) one of the response signal scalar value and the signal difference scalar value.

In this case, in the touch detection step, the approach of the conductive object towards the sensor capacitor is detected based on the selected one of the response signal scalar value and the signal difference scalar value.

This effectively reduces the amount of data used in the touch detection step. This also allows use of a touch detection program configured to use the amplitude component of the response signal for touch sensing, without using the phase component. In this case, the S/N ratio can be effectively improved even when such a touch detection program is used, because the data supplied to the touch detection program includes the scalar value of the signal difference, and therefore incorporates information of the phase component of the sensor response signal.

[12] Touch Sensing Scheme

In connection with item [9], the touch detection step may include: holding a baseline vector area data indicating a baseline vector area in a two-dimensional space in which the frequency domain representation is defined and a touch sensed area data indicating a touch sensed area in the two-dimensional space. In this case, in the touch detection step, the conductive object is determined as approaching the sensor capacitor when the end point of the delta vector is positioned in the touch sensed area in the two-dimensional space with the initial point of the delta vector defined at a position corresponding to the baseline vector in the baseline vector area.

This allows achieving touch sensing with a simple circuit configuration.

[13] Touch Sensed Area

In connection with item [12], when the baseline vector area is defined as a circular area, the touch sensed area may be defined with a range of a radius from the center of the baseline vector area and a range of an azimuth from a reference direction defined in the two-dimensional space.

This allows achieving touch sensing with a further simple algorithm.

[14] Frequency of Sensing Wave Signal

In connection with any of items [9] to [13], the fundamental frequency of the sensing wave signal is preferably higher than the inverse number of three times of a charging and discharging time constant of the sensor capacitor.

This allows further improving the S/N ratio. This is because the fundamental frequency of the sensing wave signal is set to a frequency region higher than a frequency region in which noise level resulting from the environment is high, which effectively suppresses the noise level. Although the phase component of the response signal is increased when the frequency of the sensing wave signal is increased, the signal component determining the S/N ratio is not decreased, since a vector incorporating information of both of the amplitude and phase components is used as the signal component. This means that the S/N ratio is further improved.

[15] Touch Sensing including Fourier Transform, Delta Vector Calculation and Touch Detection Provided in still another embodiment is a touch sensing method implemented in a signal processing circuit or a processor (401) which executes a program, for sensing an approach of a conductive object toward a sensor capacitor ($C_B$) on the basis of a response signal (sensor response) generated by the sensor capacitor in response to a sensing wave signal applied to the sensor capacitor. The touch sensing method includes:

a Fourier transform step of calculating a response signal vector (S=(Sx0, Sx1)) for a frequency component of the sensing wave signal by converting (1) the response signal into a frequency domain representation;

a delta vector calculating (3) step of calculating a delta vector (D=(Dx0, Dx1)) which is the vector difference between the response signal vector and the baseline vector (B=(Bx0, Bx1)); and a touch detection step (5) of detecting an approach of a conductive object towards the sensor capacitor on the basis of the calculated delta vector.

This significantly improves the S/N ratio of the sensor response signal, enhancing the sensitivity of touch sensing.

[16] Selection of Vectors

In connection with item [16], the touch detection step may further include a step of detecting an approach of a conductive object towards the sensor capacitor on the basis of the response signal vector.

This allows alternatively performing touch sensing based on the response signal vector when the baseline vector is not yet generated or when the baseline vector is temporarily made unsuitable for touch sensing.

[17] Magnitude Calculation and Selection of Scalar Values

In connection with item [15], the touch sensing method may further include the following steps of:

calculating (6) a response signal scalar value corresponding to the magnitude of the response signal vector;

calculating (7) a signal difference scalar value corresponding to the magnitude of the delta vector; and selecting (4) one of the response signal scalar value and the signal difference scalar value. The touch detection step is performed in response to the selected one the response signal scalar value and the signal difference scalar value.

This effectively reduces the amount of data used in the touch detection step. This also allows use of a touch detection program configured to use the amplitude component of the response signal without using the phase component. In this case, the S/N ratio can be effectively improved even when such a conventional touch detection program is used, because the data supplied to the touch detection program includes the scalar value of the signal difference, and therefore incorporates information of the phase component of the sensor response signal.

[18] Touch Sensing Scheme

In connection with item [15], the touch detection step may include: holding a baseline vector area data indicating a baseline vector area in a two-dimensional space in which the frequency domain representation is defined and a touch sensed area data indicating a touch sensed area in the two-dimensional space. In this case, in the touch detection step, the conductive object is determined as approaching the sensor capacitor when the end point of the delta vector is positioned in the touch sensed area in the two-dimensional space with the initial point of the delta vector defined at a position corresponding to the baseline vector in the baseline vector area.

This allows achieving touch sensing with a simple circuit configuration.

[19] Touch Sensed Area

In connection with item [18], when the baseline vector area is defined as a circular area, the touch sensed area may be defined with a range of a radius from the center of the baseline vector area and a range of an azimuth from a reference direction defined in the two-dimensional space.

This allows achieving touch sensing with a further simple algorithm.

[20] Frequency of Sensing Wave Signal

In connection with any of items [15] to [19], the fundamental frequency of the sensing wave signal may be higher than the inverse number of three times of a charging and discharging time constant of the sensor capacitor.

This allows further improving the S/N ratio. This is because the fundamental frequency of the sensing wave signal is set to a frequency region higher than a frequency region in which noise level resulting from the environment is high, which effectively suppresses the noise level. Although the phase component of the response signal is increased when the frequency of the sensing wave signal is increased, the signal component determining the S/N ratio is not decreased, since a vector incorporating information of both of the amplitude and phase components is used as the signal component. This means that the S/N ratio is further improved.

2. Details of Embodiments

In the following, a detailed description is given of various embodiments.

Embodiment 1

Figure 5:
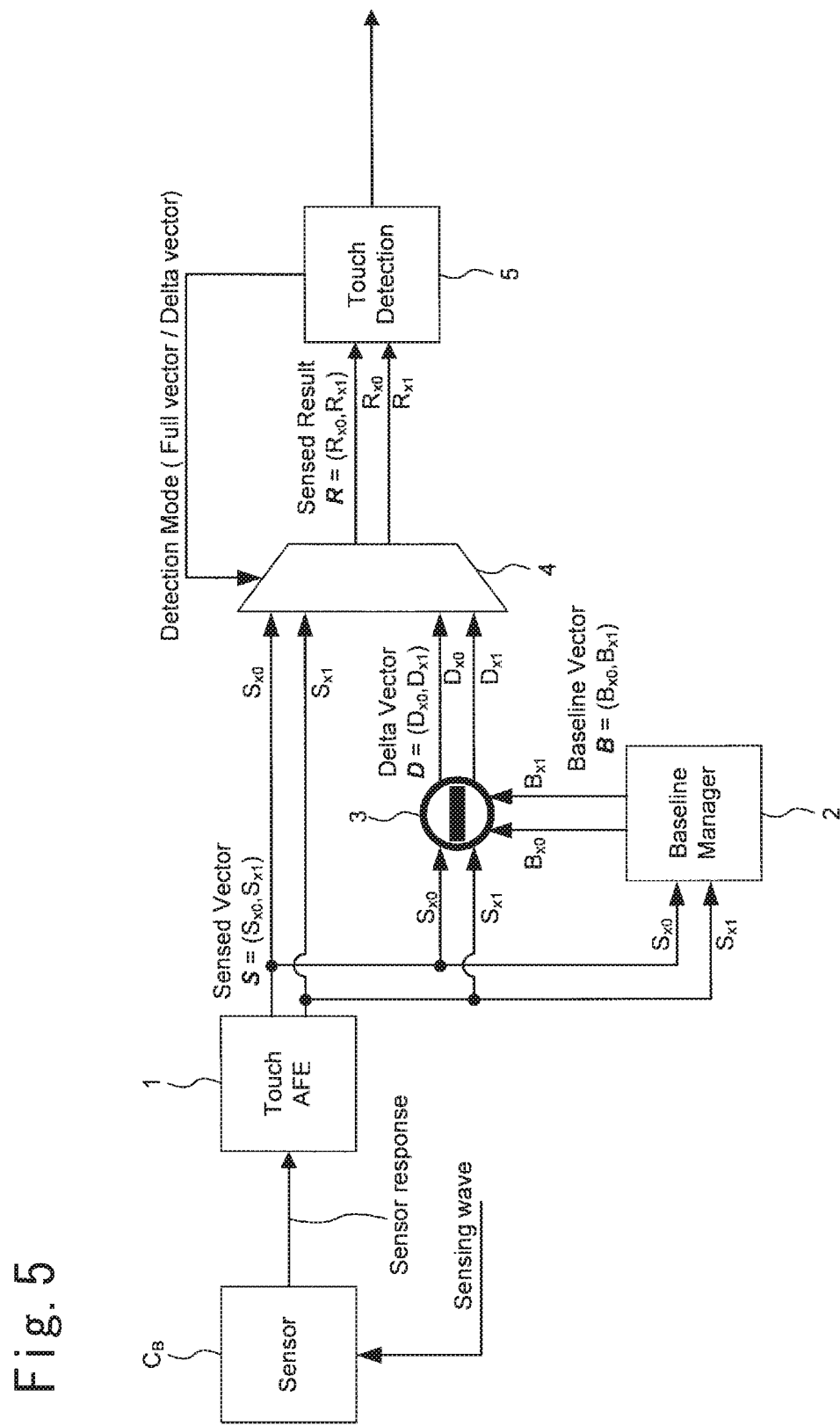
FIG. 5 is a block diagram illustrating a configuration example of a touch sensing circuit in one embodiment.

FIG. 5 is a block diagram illustrating one exemplary configuration of a touch sensing circuit in one embodiment. The touch sensing circuit of the present embodiment is configured to sense an approach of a conductive object toward a sensor capacitor $C_B$ (also referred to as a sensor node) through measuring a response signal (sensor response) generated by the sensor capacitor $C_B$ in response to a sensing wave signal applied to the sensor capacitor. The touch sensing circuit includes a baseline vector manager circuit 2, a vector subtraction circuit 3 and a demultiplexer 4. The touch sensing circuit is connected to a conversion circuit (touch AFE (analog front end)) 1 and a touch detection circuit 5. Although signals illustrated in FIG. 5 are actually one- or more-bit digital signal transmitted over one or more interconnections, the signals are not illustrated as being transmitted over a bus. This also applies to other embodiments and block diagrams disclosed in the present application.

The conversion circuit (touch AFE) 1 calculates a response signal vector S=(Sx0, Sx1) for the fundamental frequency of the sensing wave signal by converting the response signal into a frequency domain representation. The conversion circuit 1 may include an A/D (analog to digital) conversion circuit and a Fourier transform circuit, for example.

The baseline vector manager circuit 2 holds a baseline vector B=(Bx0, Bx1). The baseline vector is a response signal vector (sensed vector) corresponding to a response signal for the state in which no conductive object, such as a human finger, approaches towards the sensor capacitor $C_B$. The baseline vector is determined on electrical properties of the touch panel, including the capacitance of the sensor capacitor $C_B$. The baseline vector depends on the manufacture variations of the touch panel, and varies due to environmental influences such as the power supply voltage and the temperature. Accordingly, the baseline vector is initialized in booting or the like and updated thereafter at desired timing.

The vector subtraction circuit 3 calculates a delta vector D=(Dx0, Dx1) which is a vector difference between the response signal vector (sensed vector) and the baseline vector.

The touch detection circuit 5 basically detects an approach of a conductive object towards the sensor capacitor $C_B$ on the basis of the delta vector.

This significantly improves the S/N ratio of the response signal (sensor response), enhancing the sensitivity of touch sensing, compared with touch sensing only based on the amplitude component of the response signal. As illustrated in FIGS. 3 and 4, use of the vector difference allows obtaining a larger signal component S of the S/N ratio than use of the difference only in the amplitude component between the response signal vector and the baseline vector.

In a preferred embodiment, the touch sensing circuit further includes a demultiplexer 4 as illustrated in FIG. 5. The demultiplexer 4 supplies a selected one of the response signal vector and the delta vector to the touch detection circuit 5. For example, the demultiplexer 4 selects the response signal vector when the touch detection circuit 5 specifies a full vector mode as the detection mode, and selects the delta vector when the touch detection circuit 5 specifies a delta vector mode as the detection mode. The demultiplexer 4 supplies the selected vector as the sensed result vector R=(Rx0, Rx1) to the touch detection circuit 5.

This allows performing touch sensing based on the response signal vector when the baseline vector is not yet generated or when the baseline vector is temporarily made unsuitable for touch sensing.

In the following, a detailed description is given of advantageous effects of the present embodiment.

In the touch sensing circuit of the present embodiment, the delta vector calculated from the response signal generated in response to an approach of a conductive object towards the sensor capacitance $C_B$ (that is, occurrence of touching) has an amplitude and argument depending on the state of the sensor capacitor $C_B$. Use of the argument information of the delta vector allows separation of the true signal from noise with respect to an event which causes only a reduced amplitude variation such as hovering, and detection of a state transition from hovering to touching on the basis of the time variations in the delta vector.

Figure 6:
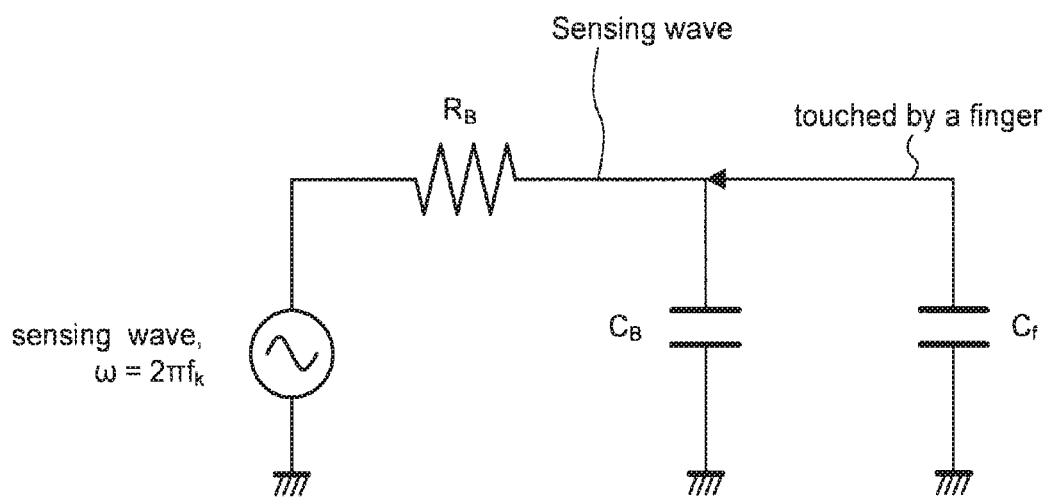
FIG. 6 is an illustration schematically illustrating the principle of capacitive touch sensing.

FIG. 6 is an illustration schematically illustrating the principle of capacitive touch sensing. The sensing wave signal is applied to the sensor capacitor $C_B$ and an approach of an conductive object towards the sensor capacitor $C_B$ is sensed by measuring the response signal (sensor response) obtained from the sensor capacitor $C_B$. In FIG. 6, the resistor $R_B$ represents the resistor component distributed over the signal transmission route from the sensing wave signal to the response signal as a lumped resistor. When a conductive object such as a human finger approaches towards the sensor capacitor $C_B$, the capacitance of the sensor capacitor $C_B$ varies due to the influence on the electric field around the sensor capacitor $C_B$. Although FIG. 6 illustrates that a capacitance $C_f$ is connected in parallel to the sensor capacitor $C_B$, the variations in the capacitance is not limited to the increasing direction. The legends "$C_B$", "$C_f$" and "$R_B$" each indicate a capacitive or resistive element and also indicate the capacitance or resistance value.

The waveform of the sensing wave signal may be selected as desired. The fundamental frequency of the sensing wave signal is $f_k$ and the angular frequency is $\omega$ ($=2\pi f_k$). The signal transmission route from the sensing wave signal to the response signal has a time constant $\tau_B$ ($=R_B \cdot C_B$) for charging and discharging the sensor capacitor $C_B$. The time constant $\tau_B$ changes to $R_B \cdot (C_B+C_f)$ when a conductive object approaches towards the sensor capacitor $C_B$.

Figure 7:
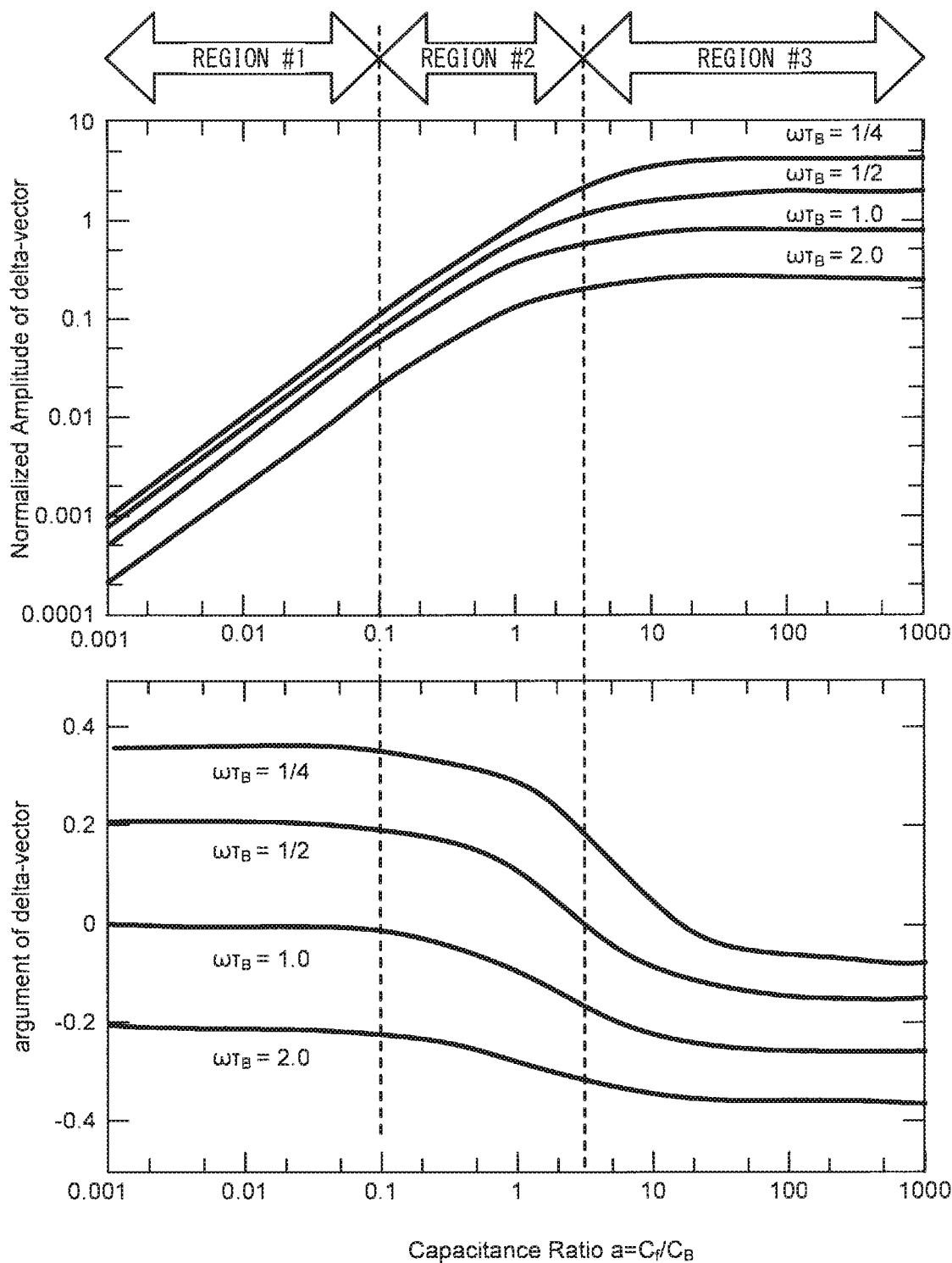
FIG. 7 is a characteristic diagram illustrating example characteristics of the touch sensing circuit of various frequencies of the sensing wave signal in one embodiment.

FIG. 7 is a characteristic diagram illustrating the characteristics of the touch sensing circuit of the present embodiment for various frequencies of the sensing wave signal.

The vertical axis represents the capacitance ratio a ($=C_f/C_B$). When no conductive object exists, the capacitance ratio a is zero. The capacitance ratio a is increased as a conductive object approaches closer to the sensor capacitor $C_B$ and as the size of the conductive object is increased. Illustrated in FIG. 7 are regions #1, #2 and #3 in which the capacitance ratio a is smaller in this order. The vertical axis of the upper graph represents the normalized amplitude of the delta vector and the vertical axis of the lower graph represents the argument of the delta vector.

The normalized amplitude and the argument are illustrated for the four cases in which $\omega \tau_B$ is ¼, ½, 1 and 2, respectively, where $\omega \tau_B$ is the product of the angular frequency $\omega$ of the sensing wave signal and the time constant $\tau_3$ ($=R_B \tau C_B$).

Described below is the feature of variations in the delta vector obtained from the response signal caused by an approach of a conductive object towards the sensor capacitor $C_B$.

In region #1, in which the variations in the capacitance are small due to a reduced size of the conductive object or an increased distance between the sensor capacitor $C_B$ and the conductive object, the delta vector has an argument mainly depending on the angular frequency ω of the sensing wave signal and an amplitude proportional to the capacitance ratio a.

When the capacitance ratio a is increased to some degree due to a further approach or contact of the conductive object towards or with the sensor capacitor $C_B$, as illustrated in region #2, the argument also varies depending on the capacitance ratio a, while the amplitude increases proportionally to the capacitance ratio a.

When the capacitance ratio a is extremely increased through a huge change in the capacitance caused by an approach or contact of a large-sized conductive object towards or with the sensor capacitor $C_B$, as illustrated in region #3, only the argument varies depending on the increase in the capacitance ratio a with the amplitude saturated.

As thus discussed, it is possible to detect changes in the distance from a conductive object or detect a distant or small conductive object, on the basis of features of variations in the delta vector depending on variations in the capacitance (or in the capacitance ratio a).

Furthermore, by setting the angular frequency ω of the sensing wave signal higher than that conventionally used, it is possible to detect variations in the response signal caused by touching more efficiently, especially when the contribution of variations in the argument is large.

Figure 8:
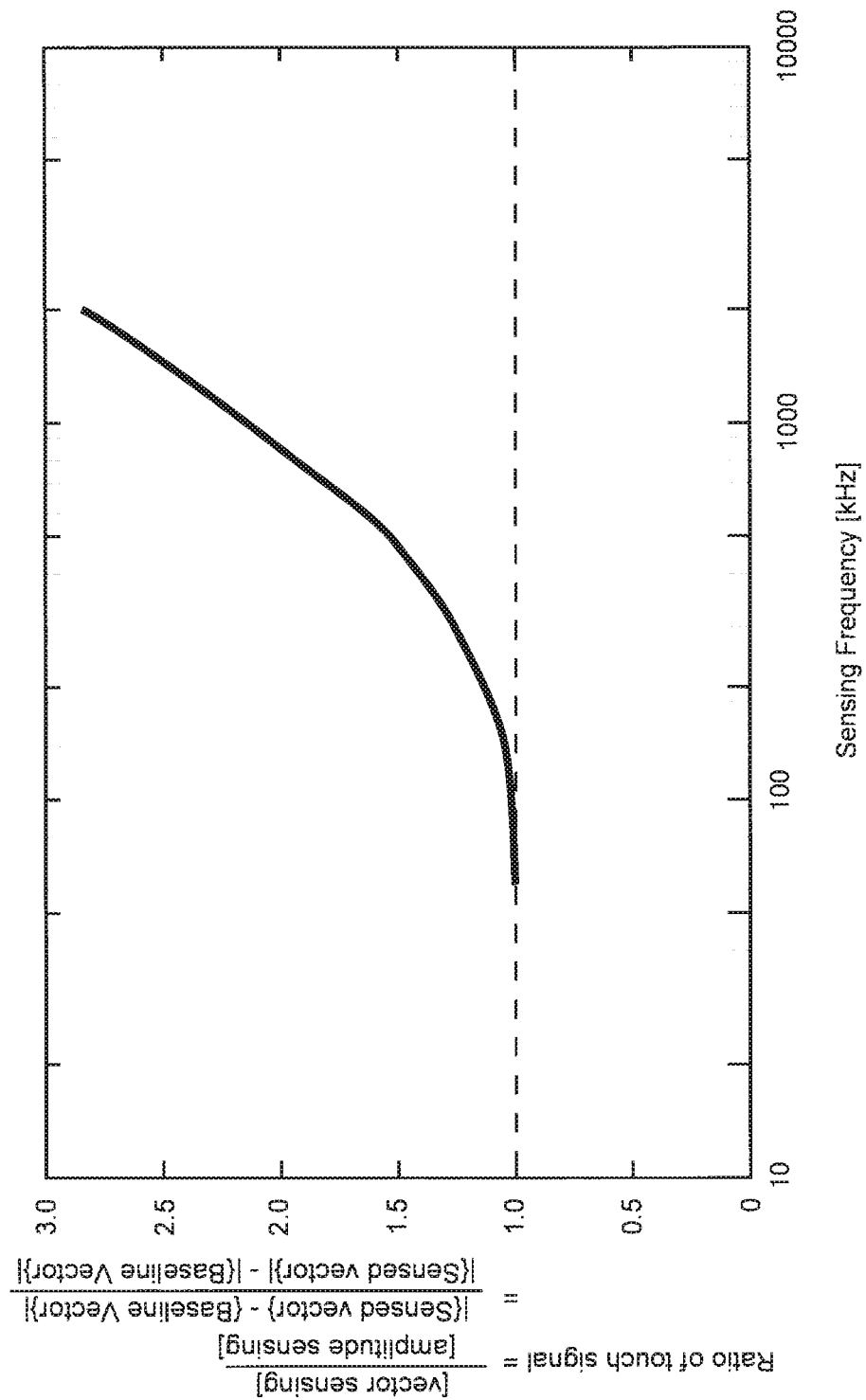
FIG. 8 is a characteristic diagram illustrating the dependence of the signal component strength of the response signal on the frequency of the sensing wave signal in one embodiment.

FIG. 8 is a characteristic diagram illustrating the signal component strength of the response signal for various frequencies of the sensing wave signal in the touch sensing circuit of the present embodiment. The horizontal axis represents the frequency $f_k$ of the sensing wave signal. In FIG. 8, the frequency $f_k$ is illustrated in units of kHz, in place of the angular frequency ω. The vertical axis represents the ratio of the signal levels achieved by the vector sensing based on the delta vector and the amplitude sensing based on the amplitude of the response signal. For the vector sensing based on the delta vector, the signal level is defined as the magnitude of the delta vector, which is the vector difference between the response signal vector (sensed vector) and the baseline vector. For the amplitude sensing, on the other hand, the signal level is defined as the difference of the magnitude of the response signal vector and that of the baseline vector.

It would be understood from FIG. 8 that the vector sensing based on the delta vector allows obtaining a larger signal level than the amplitude sensing in the high frequency region above 100 kHz. In this example, $\tau_B=1/(500\ kHz)$. In a technique based on amplitude sensing, the upper limit of the frequency $f_k$ of the sensing wave signal is about 160 kHz. The technique disclosed in the present embodiment allows using a sensing wave signal of a higher frequency, and this allows obtaining a larger signal level, increasing the S/N ratio and improving the sensitivity of touch sensing, compared with the amplitude sensing.

Regarding the frequency $f_k$ of the sensing wave signal. From the reason discussed at the beginning of the section entitled "Detailed Description of Preferred Embodiments", the frequency of the sensing wave signal is conventionally restricted to a relatively low frequency to reduce the phase noise. For example, the cut-off frequency, which is calculated from the time constant of the detection target given as the product of the capacitance of the sensor capacitor and the output resistance of the sensing signal drive circuit or the input resistance of the touch sensing circuit, is in a range from 500 kHz to 1 MHz, and therefore the upper limit of the frequency of the sensing wave signal is sometimes said to be about 160 kHz. The upper limit of the frequency of the sensing wave signal corresponds to the inverse number of three times of the time constant. A touch sensing circuit, which is based on touch sensing in the time domain, not in the frequency domain, can be understood as being composed of an integration circuit. For a sensing wave signal of a step waveform, the waveform of the step response e can be represented as:

$$e=e_0(1-\exp(-t/\tau)).$$

This implies that the step response e reaches 63.2% (=1−exp(−1)) of the full amplitude $e_0$ at time t=τ, reaches 86.2% (=1−exp(−2)) at time t=2τ, and reaches 95.0% (=1−exp(−3)) at time t=3τ. When the integration time of the integration circuit is set to three times of the time constant, the amplitude is observed as 95.0% of the full amplitude. The error of −5.0% thus obtained has been considered as the upper limit of the acceptable error. Accordingly, since the cut-off frequency, which is calculated from the time constant of the detection target given as the product of the capacitance of the sensor capacitor and the output resistance of the sensing signal drive circuit or the input resistance of the touch sensing circuit, is in a range from 500 kHz to 1 MHz, the upper limit of the sensing wave signal has been considered as about 160 kHz, which is calculated as the inverse number of three times of the time constant.

Meanwhile, the frequencies of most kinds of noise transmitted through a human body such as a user performing the touch operation are concentrated in a frequency region below 1 MHz in a typical environment in which the touch sensor is placed; for example, the frequency of power supply noise generated by a switching regulator mounted on a power supply circuit or a battery charger is in a range from 50 to 100 kHz.

Accordingly, when the frequency $f_k$ of the sensing wave signal is set to a high frequency above 100 kHz, more specifically, a frequency above the inverse number of three times of the charging and discharging time constant of the sensor capacitor $C_B$ (=1/(3×$\tau_3$)), for example, a frequency above 160 kHz, this allows setting the frequency $f_k$ of the sensing wave signal in the frequency in which power supply noise concentrated in the frequency range below 1 MHz, typically 50 to 100 kHz, does not exist or an extremely small level of noise exists. This effectively reduces the noise component N of the S/N ratio and further improves the S/N ratio, enhancing the sensitivity of touch sensing.

Embodiment 2

Figure 9:
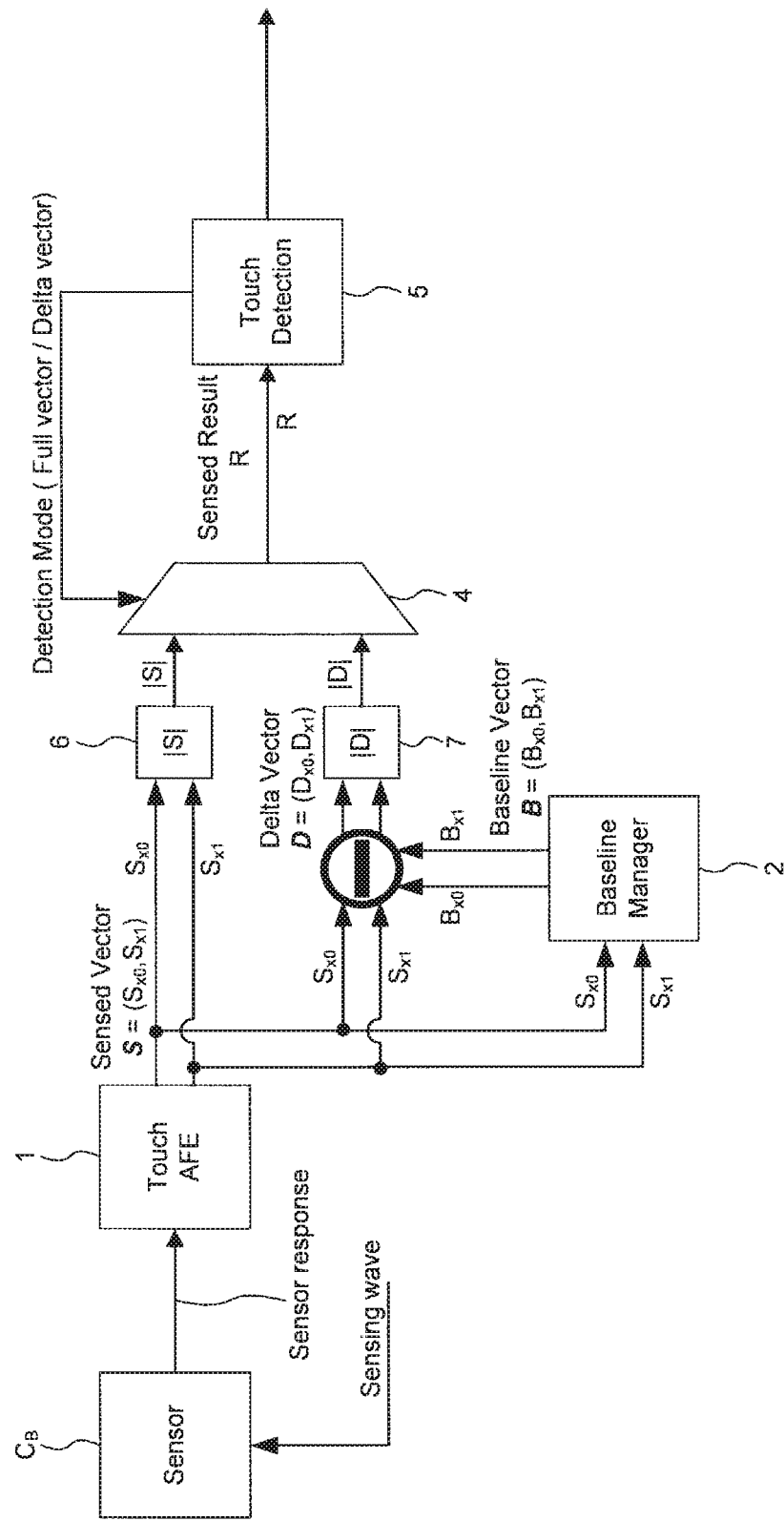
FIG. 9 is a block diagram illustrating a configuration example of a touch sensing circuit in another embodiment.

FIG. 9 is a block diagram illustrating a configuration example of the touch sensing circuit in embodiment 2. The touch sensing circuit of this embodiment further includes a magnitude calculation circuit 6 calculating a response signal scalar value which corresponds to (or indicates) the magnitude |S| of the response signal vector (sensed vector) S=(Sx0, Sx1) and a magnitude calculation circuit 7 calculating a signal difference scalar value which corresponds to (or indicates) the magnitude |D| of the delta vector D=(Dx0, Dx1). In accompany with this, the demultiplexer 4 supplies a selected one of the response signal scalar value and the signal difference scalar value to the touch detection circuit 5 as the sensed result R. Other configurations and operations are as described in embodiment 1 and therefore no detailed description is given.

Although the magnitude of the vector (x0, x1) is mathematically defined as the square root of the sum of the squares of elements x0 and x1, the response signal scalar value and the signal difference scalar value may not be calculated strictly in accordance with this mathematical definition. The response signal scalar value and the signal difference scalar value may be calculated as norms of the response signal vector S and the delta vector D, respectively. For example, the response signal scalar value and the signal difference scalar value may be calculated as the sums of the squares of the elements of the response signal vector S and the delta vector D, respectively, without calculating the square root. Alternatively, the response signal scalar value and the signal difference scalar value may be calculated as the sums of the absolute values of the elements of the response signal vector S and the delta vector D, respectively. This allows simplifying the circuit configurations of the magnitude calculation circuits 6 and 7, reducing the circuit sizes thereof. Also when the calculation of the response signal scalar value and the signal difference scalar value is implemented by software, this allows reducing the number of steps to be executed. When the sums of the squares of the elements of the response signal vector S and the delta vector D are used, the touch sensing algorithm is slightly modified accordingly. When the sums of the absolute values of the elements of the response signal vector S and the delta vector D are used, a possible error caused by the use of the sums of the absolute values is estimated.

The use of the magnitude calculation circuits 6 and 7 effectively reduces the amount of data to be supplied to the touch detection circuit 5. This also allows connecting the demultiplexer 4 to a touch detection circuit which uses the amplitude component of the response signal without using the phase component. In this case, even when such a touch detection circuit is used, the data supplied to the touch detection circuit includes the signal difference scalar value which depends on the phase component of the response signal. This allows improving the S/N ratio compared with the case in which the amplitude component of the response signal is used.

Embodiment 3

A detailed description is given of the operation of the touch detection circuit 5 in the following.

Figure 10:
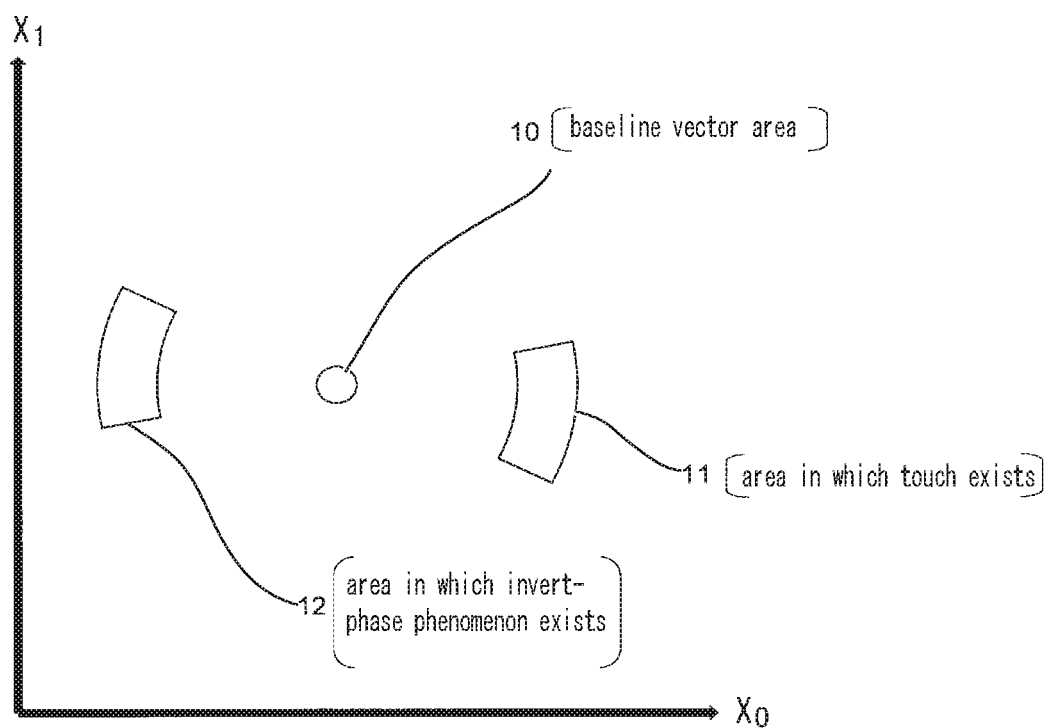
FIG. 10 is an illustration illustrating the principle of the touch detection algorithm performed in the touch detection circuit in one embodiment.
Figure 11:
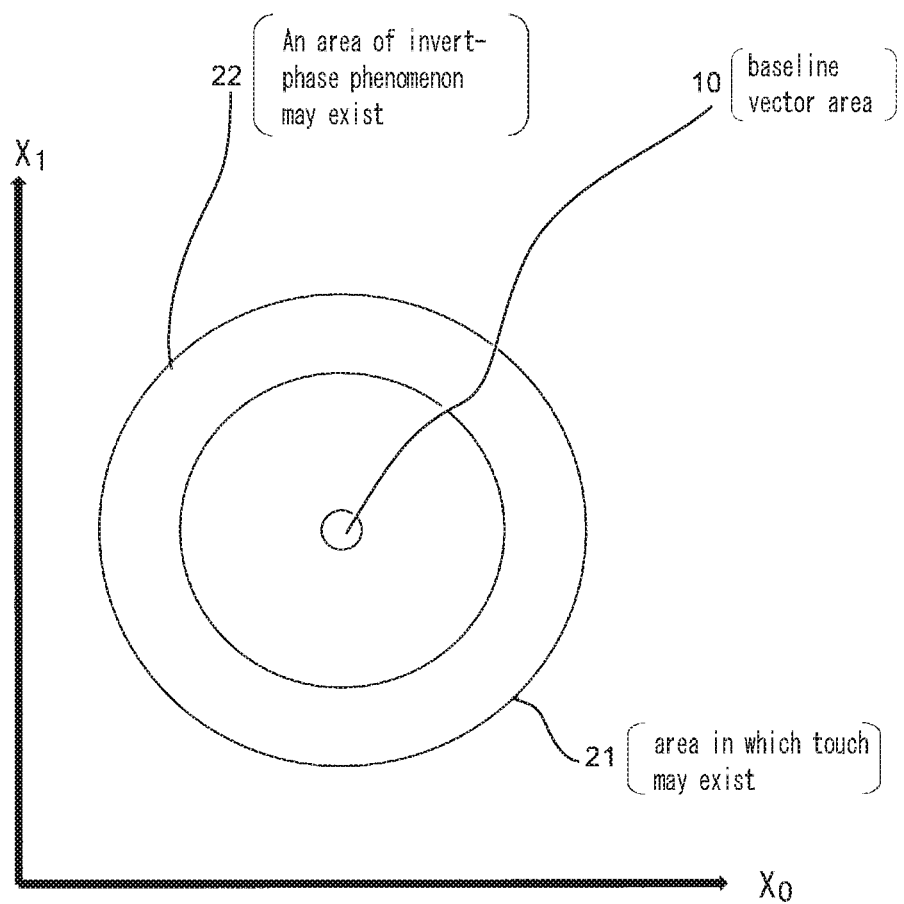
FIG. 11 is an illustration illustrating the touch sensed region for the case when touch sensing is achieved on the basis of the amplitude information, ignoring the phase information.
Figure 12:
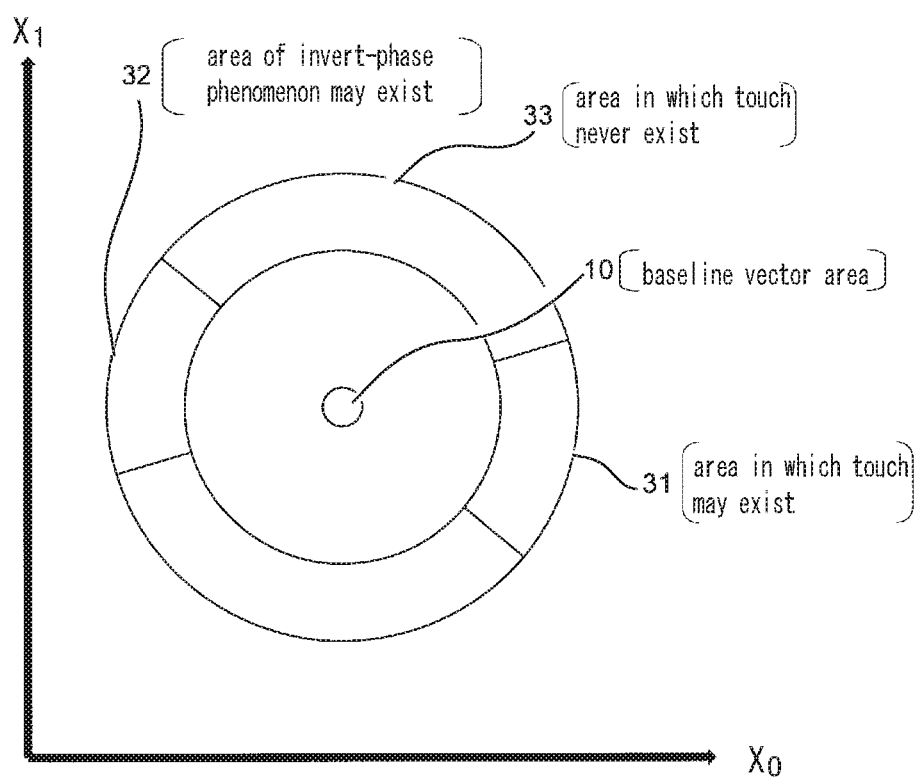
FIG. 12 is an illustration illustrating the determination region for the case when touch sensing is achieved on the basis of the combination of amplitude information and phase information.

FIGS. 10 to 12 are illustrations illustrating a touch detection algorithm performed in the touch detection circuit 5 in one embodiment. In all of FIGS. 10 to 12, the frequency domain representation for the fundamental frequency $f_k$ of the sensing wave signal is illustrated in a two-dimensional space defined with the real number axis x0 and imaginary number axis x1. The touch detection circuit 5 basically receives the delta vector D=(Dx0, Dx1) generated from the response signal and FIGS. 10 to 12 illustrate the relation between the baseline vector B=(Bx0, Bx1) and the delta vector D.

Illustrated in FIG. 10 are a baseline vector area 10, a true touch existence area 11, and an invert-phase phenomenon existence area 12. The baseline vector area 10 is defined as an area in which the end point of the baseline vector B=(Bx0, Bx1) is possibly positioned when the initial point of the baseline vector B is defined at the origin. In this embodiment, the baseline vector area 10 is defined as a circular area. The true touch existence area 11 is defined as an area in which a true touch exists, and the invert-phase phenomenon existence area 12 is defined as an area in which an invert-phase phenomenon of a true touch exists. The true touch existence area 11 and the invert-phase phenomenon existence area 12 can be each defined with a range of the distance (or the radius) from the center of the baseline vector area 10 and a range of the azimuth from a reference direction defined in the two-dimensional space in which the frequency domain representation is defined (e.g., the direction of the real number axis x0).

Illustrated in FIG. 11 are touch sensed areas 21 and 22 when the existence of a touch is detected on the basis of the magnitude of the delta vector, ignoring the argument. The touch sensed area 21 is an area in which a touch may exist and the touch sensed area 22 is an area in which an invert-phase phenomenon of a touch may exist. The touch sensed areas 21 and 22 are each defined with a range of the distance from the center of the baseline vector area 10. The touch sensed areas 21 and 22 are both ring-shaped and there is no explicit boundary to separate the touch sensed areas 21 and 22. This implies that the touch sensed areas 21 and 22 are each defined to include the true touch existence area 11 and the invert-phase phenomenon existence area 12.

Illustrated in FIG. 12 are touch sensed areas 31 and 32 when the existence of a touch is detected on the basis of the combination of the magnitude and argument of the delta vector. No-touch sensed areas 33 are also illustrated in FIG. 12. The touch sensed area 31 is an area in which a touch may exist and the touch sensed area 32 is an area in which an invert-phase phenomenon of a touch may exist. The no-touch sensed areas 33 are each an area in which a touch never exists. The touch sensed areas 31 and 32 are each defined with a range of the distance from the center of the baseline vector area 10 and a range of the azimuth from the reference direction defined in the two-dimensional space in which the frequency domain representation is defined (e.g., the direction of the x0 axis). The no-touch sensed area 33 is defined with the same range of the distance from the center of the baseline vector area 10 as the touch sensed areas 31 and 32, and a range of the azimuth from the reference direction other than the ranges of the azimuth defining the touch sensed areas 31 and 32. In other words, the touch sensed areas 31 and 32 are defined by excluding the no-touch sensed areas 33 in which a true touch never exists from the ring-shaped area defined with the range of the distance (or the radius) from the center of the baseline vector area 10. The touch sensed areas 31 and 32 are defined so as to include the true touch existence area 11 and the invert-phase phenomenon existence area 12, respectively.

When touch sensing is performed with the touch sensed areas 21 and 22 defined as illustrated in FIG. 11, the S/N ratio is effectively improved compared with the amplitude sensing, as a result of vector sensing based on the delta vector as described with reference to FIGS. 7 and 8, and this effectively improves the sensitivity of the touch sensing.

Furthermore, when the argument information is used for touch sensing in addition to the magnitude as illustrated in FIG. 12, this allows excluding the no-touch sensed areas 33 in which a true touch never exists, improving the accuracy of the touch sensing. Such technique is referred to as "masking with an argument mask", hereinafter. Even when the magnitude of a delta vector suffering from noise is erroneously in the range of the distance which defines the touch sensed areas 31 and 32, for example, erroneous detection of a touch can be avoided from the fact that the argument is out of the range of the azimuth which defines the touch sensed areas 31 and 32.

The touch detection algorithm illustrated in FIG. 11 can be used in the touch sensing circuits illustrated in both of FIGS. 5 and 9. To perform masking with the argument mask 33 illustrated in FIG. 12, it is preferable to use the touch detection circuit 5 illustrated in FIG. 5.

Figure 13:
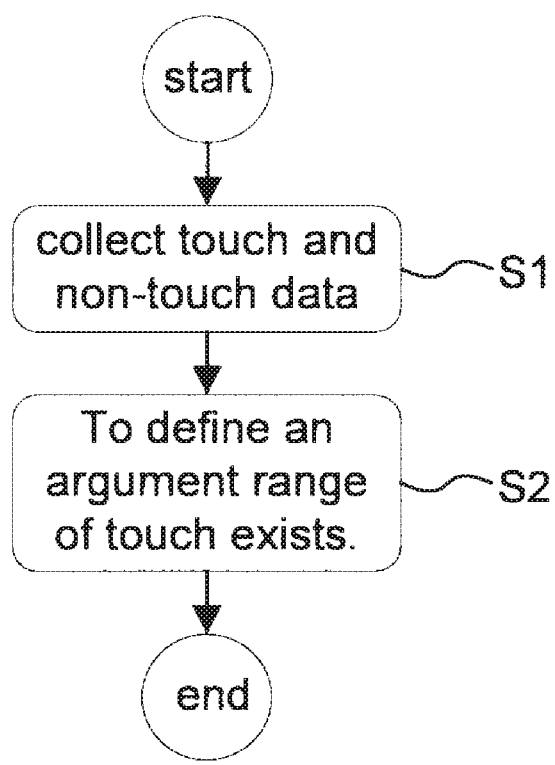
FIG. 13 is a flowchart illustrating one example of a calibration process to determine an argument mask in the touch detection circuit.

In the following, a description is given of an implementation example of the touch detection circuit 5. The above-described touch detection algorithm is achieved with a program executed by a CPU, for example. The program used for the touch detection includes a calibration process to determine the argument mask 33 and an actual touch detection process. FIG. 13 is a flowchart illustrating one example of the calibration process to determine the argument mask 33 in the touch detection circuit 5.

First, touch and non-touch data are collected at step S1. To cover possible approaching states of various conductive objects, it is preferable that a sufficient number of representative touch samples and non-touch samples are prepared in advance through experiments for sizes of conductive objects, distances from the sensor capacitor $C_B$, temperatures, power supply voltages, noise environments and so forth.

Figure 15:
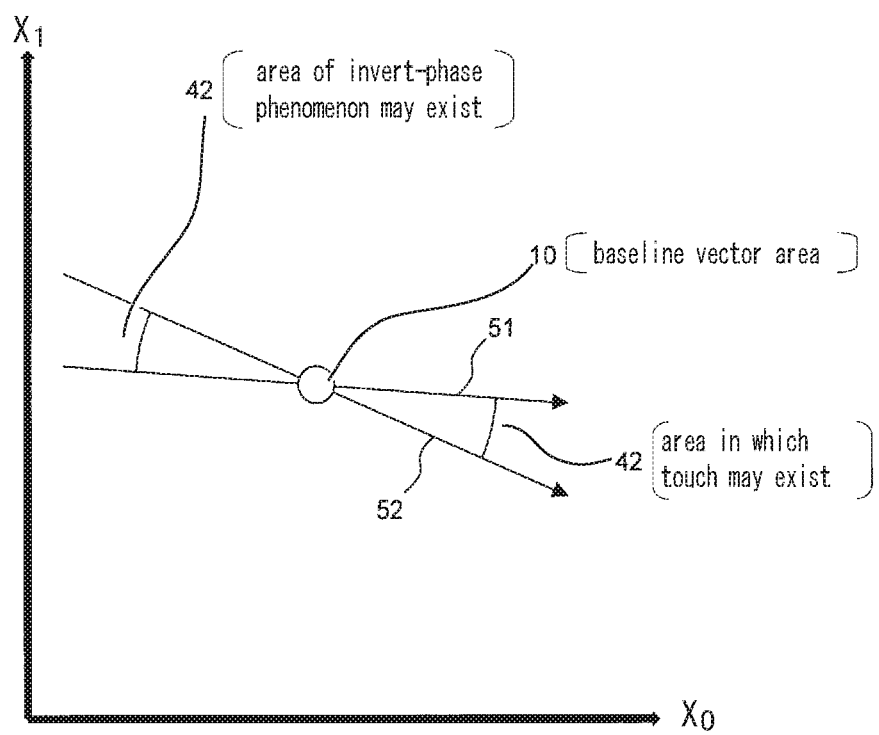
FIG. 15 is an illustration illustrating the calibration process to determine the argument mask.

This is followed by defining an argument range in which a touch exists at step S2. FIG. 15 is an illustration illustrating the calibration process to determine the argument mask 33. The data corresponding to the touch samples and non-touch samples, which are collected at step S1, are mapped to the frequency domain. First, the baseline vector area 10 is defined on the basis of the data corresponding to the non-touch samples. This is followed by defining two straight lines 51 and 52 which pass through the center of the baseline vector area 10 and specify the borders of an area 41 in which the data corresponding to the touch samples exist and an area 42 in which the data corresponding to the phase-inversion phenomena thereof exist. The argument mask 33 is defined from the range of the argument defined by these two straight lines 51 and 52. The argument mask 33 is preferably defined to include an appropriate margin.

Figure 14:
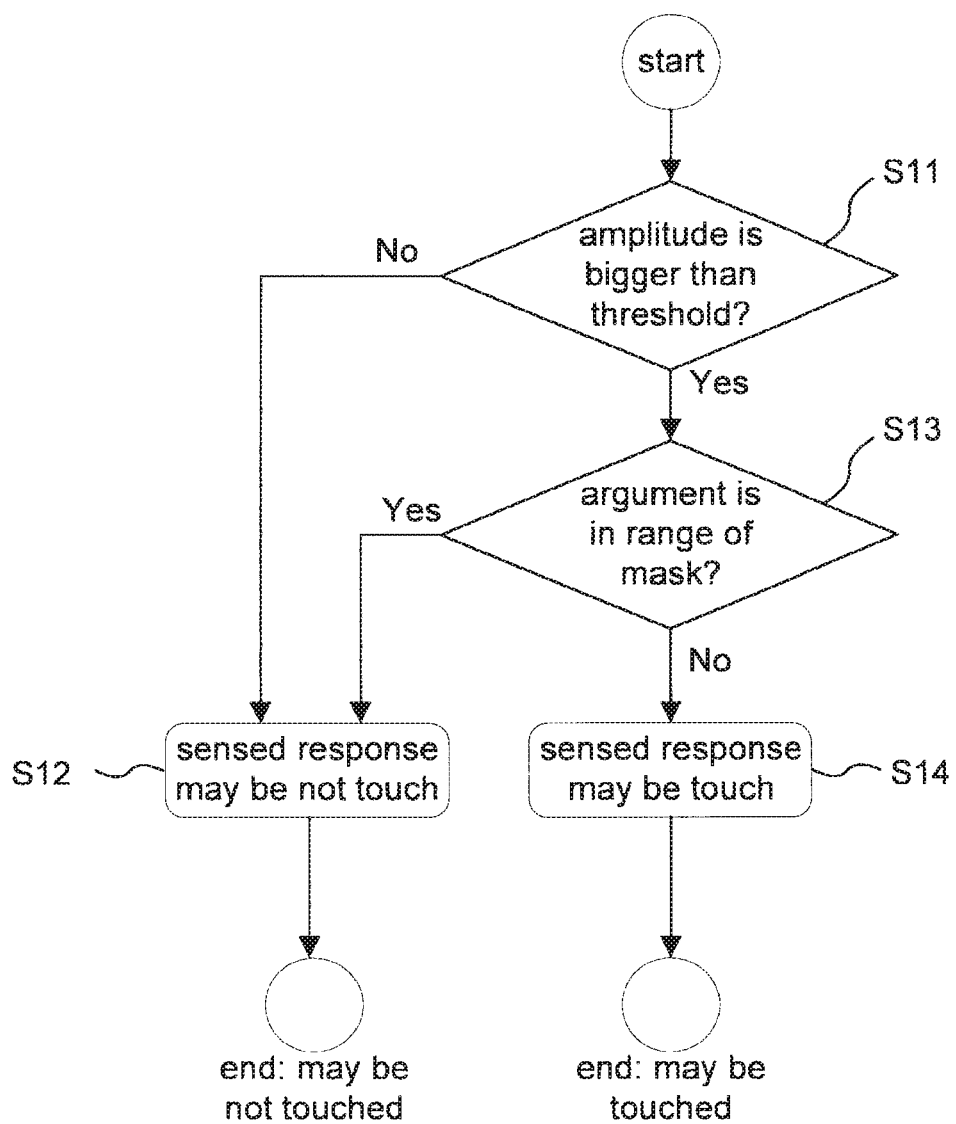
FIG. 14 is a flowchart illustrating one example of a touch detection process performed by the touch detection circuit.

FIG. 14 is a flowchart illustrating one example of a touch detection process performed by the touch detection circuit 5. The following process is performed on the delta vector D=(Dx0, Dx1).

First, the touch detection circuit 5 determines whether the magnitude of the delta vector is larger than a predetermined threshold value at step S11. The predetermined threshold value is a value corresponding to the distance (radius) from the center of the baseline vector area 10 to the touch detection region (see FIG. 12). The predetermined threshold is specified in the calibration process described above with reference to FIG. 13, on the basis of the data collected at step S1.

Figure 16:
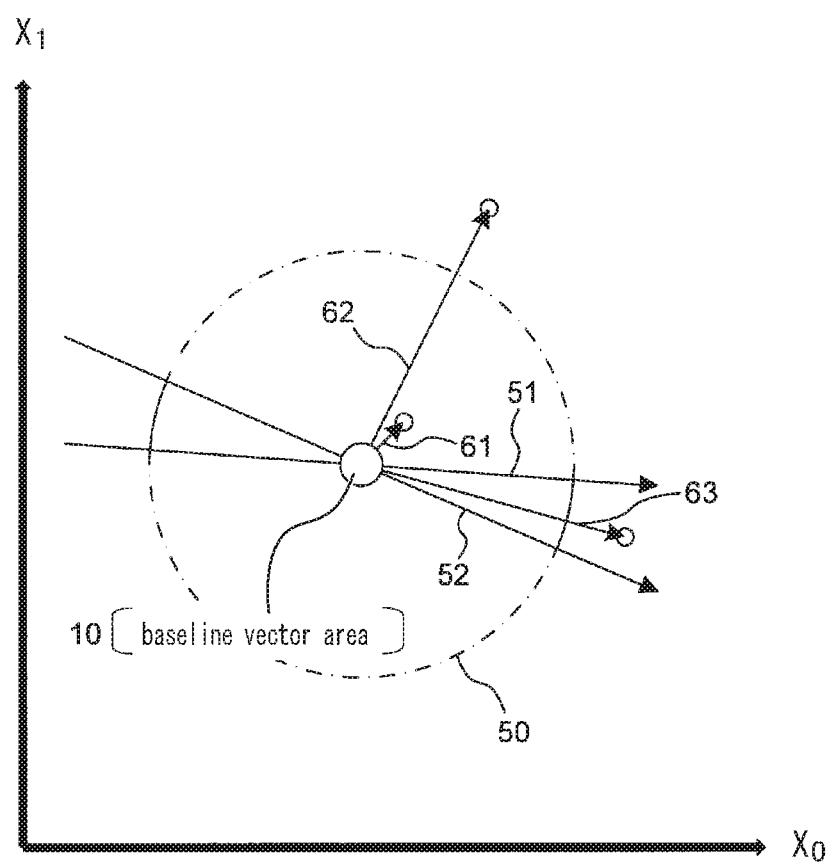
FIG. 16 is an illustration illustrating the touch detection scheme in the touch detection process.

When the magnitude of the delta vector is not larger than the threshold value, the touch detection circuit 5 determines that the response signal vector indicates that no touch exists at step S12. When the magnitude of the delta vector is larger than the threshold value, the touch detection circuit 5 determines whether the argument is in the range defined by the argument mask 33. When the argument is in the range defined by the argument mask 33, the touch detection circuit 5 determines that the response signal vector indicates that no touch exists at step S12. When the argument is not in the range defined by the argument mask 33, the touch detection circuit 5 determines that the response signal vector indicates that a touch exists at step S14. FIG. 16 is an illustration illustrating the procedure of the touch detection process.

Illustrated in FIG. 16 are frequency domain representations similar to FIG. 15, which include the baseline vector area 10, a circle 50 with a radius equal to the above-described threshold value and a center positioned at the center of the baseline vector area 10, two straight lines 51, 52 defining the argument mask 33 and three delta vectors 61, 62 and 63. When the touch detection process is performed on the delta vectors 61, 62 and 63 by the touch detection circuit 5 as illustrated in FIG. 14, the results are as follows:

The delta vector 61 is located in the circle 50 and this means the magnitude of the delta vector 61 is smaller than the threshold value. Therefore, the touch detection circuit 5 determines at step S11 that "the magnitude of the delta vector is not larger than the threshold value" and the procedure completes at step S12 to determine that the response signal vector indicates no touch exists.

As for the delta vector 62, the end point of the delta vector 62 is located outside of the circle 50, and this means that the magnitude of the delta vector 62 is larger than the threshold value. In this case, the touch detection circuit 5 determines at step S11 that "the magnitude of the delta vector 62 is larger than the threshold value"; however, the touch detection circuit 5 determines at step S13 that "the argument of the delta vector 62 is in the range of the argument mask 33" and the procedure completes at step S12 to determine that the response signal vector indicates no touch exists.

As for the delta vector 63, the end point of the delta vector 63 is located outside of the circle 50, and this means that the magnitude of the delta vector 63 is larger than the threshold value. Furthermore, the touch detection circuit 5 determines at step S13 that "the argument of the delta vector 62 is not in the range of the argument mask 33" and therefore the procedure completes at step S14 to determine that the response signal vector indicates a touch exists.

Embodiment 4

The touch sensing circuits described above may be applicable to both of the mutual capacitance touch sensing and the self-capacitance.

Figure 17:
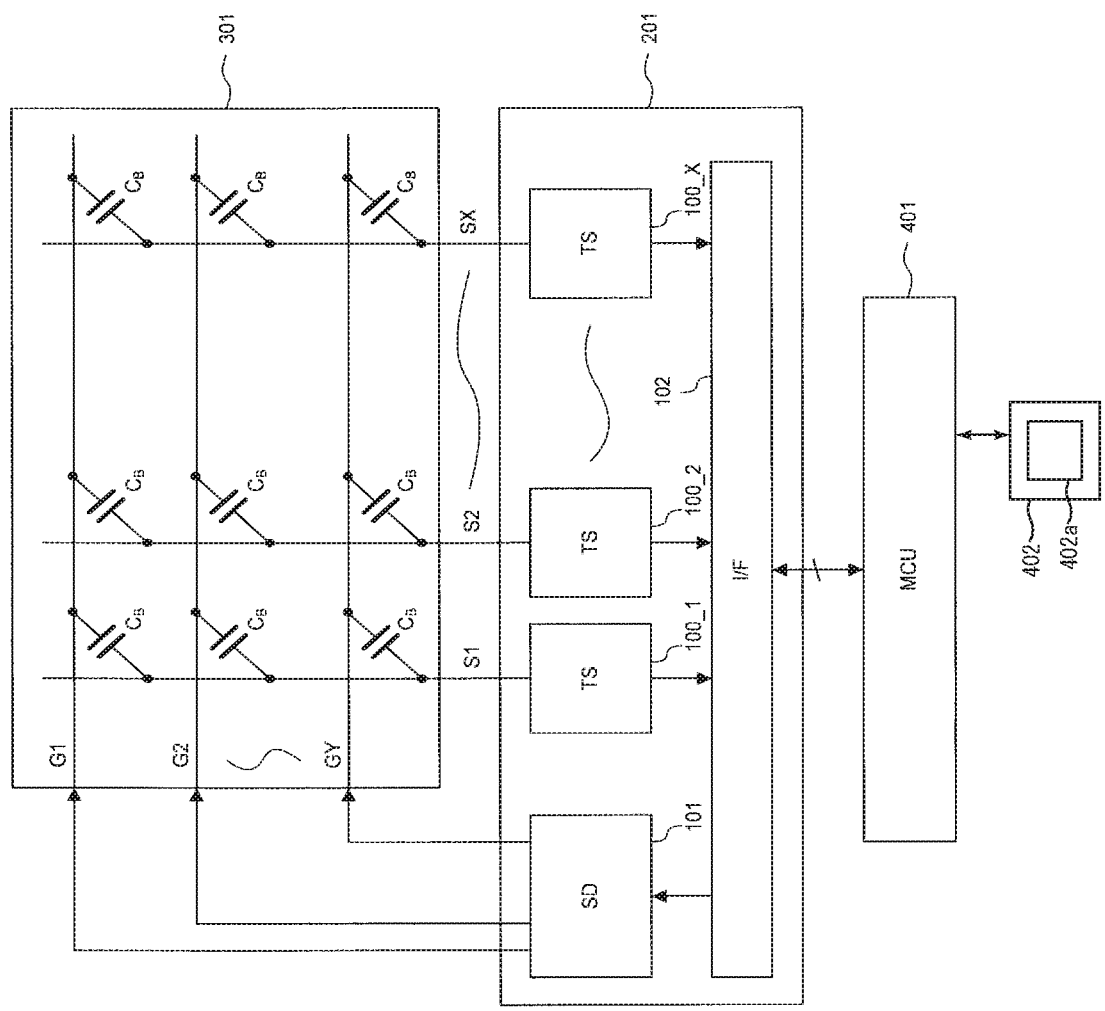
FIG. 17 is a block diagram schematically illustrating configuration examples of a touch panel and a touch controller adapted to mutual capacitance touch sensing.

FIG. 17 is a block diagram schematically illustrating a configuration example of a touch panel and a touch controller which are adapted to mutual capacitance touch sensing.

In a touch panel adapted to mutual capacitance touch sensing, which is denoted by numeral 301 in FIG. 17, sensor capacitors $C_B$ are arrayed in a matrix at respective intersections of sensing signal lines G1 to GY and response signal lines S1 to SX. The touch controller IC (integrated circuit) 201 includes a sensing signal drive circuit 101 driving the sensing signal lines G1 to GY, touch sensing circuits 100_1 to 100_X connected to the response signal lines S1 to SX, respectively, and an interface (I/F) 102. A microcontroller (MCU) 401, which is connected to the interface 102, controls the touch controller IC 201 and determines the touch coordinates on the basis of variations in the sensor capacitors $C_B$ measured by the touch sensing circuit 101_1 to 101_X. In the mutual capacitance touch sensing, the sensing signal lines G1 to GY are sequentially driven and this causes charging and discharging currents to appear on the response signal lines S1 to SX depending on the capacitances of the sensor capacitors $C_B$. The touch sensing circuits 100_1 to 100_X measure the current levels of the charging and discharging currents. Since the current level of a response signal varies depending on variations in the capacitance of the corresponding sensor capacitor $C_B$, a decrease in the capacitance of the sensor capacitor $C_B$ caused by an approach of a conductive object such as a finger of a user can be detected.

The sensing wave signals, one of which is also illustrated in FIGS. 5 and 9, are sequentially applied to the sensor capacitors $C_B$ via the sensing signal lines G1 to GY. Touch sensing is performed on the censor capacitors $C_B$ connected to a selected one of the sensing signal lines G1 to GY to which the sensing wave signal is applied. The conversion circuit (touch AFE) 1, the baseline vector manager circuit 2, the vector subtraction circuit 3 and the demultiplexer 4 are integrated in each of the touch sensing circuit 100_1 to 100_X. The magnitude calculation circuits 6 and 7 illustrated in FIG. 9 may be also integrated in each of the touch sensing circuits 100_1 to 100_X. The touch detection circuit 5 is implemented as a combination of the microcontroller 401 and a software program 402a stored in a storage device 402. The storage device 402 is a non-transitory tangible storage medium which stores therein the software program 402a. When the configuration of the touch sensing circuit of embodiment 1 (illustrated in FIG. 5) is used, the sensed results including vector information are transmitted to the microcontroller (MCU) 401 via the interface (I/F) 102. When the configuration of the touch sensing circuit of embodiment 2 (illustrated in FIG. 9) is used, the sensed results including scalar information are transmitted to the microcontroller (MCU) 401 via the interface (I/F) 102.

Some or all of the functions of the touch detection circuit 5 may be implemented as hardware in the touch sensing circuits 100_1 to 100_X. In an alternative embodiment, some or all of the functions of the touch detection circuit 5 may be implemented as a single hardware circuit commonly used for the touch sensing circuits 100_1 to 100_X in the touch controller IC 201. Some of the functions of the touch detection circuit 5 may be implemented as some of the functions of programs executed by a different processor communicably connected to the microcontroller (MCU) 401, such as an application processor provided in a system including the touch panel 301, the touch controller IC 201 and the microcontroller (MCU) 401.

Some of the functions of the baseline vector manager circuit 2 may be implemented as a software program executed by the microcontroller 401, the software program being stored in the storage device 402 in accompany with the functions of the touch detection circuit 5. In an alternative embodiment, some of the functions of the baseline vector manager circuit 2 may be implemented as a single hardware circuit commonly used for the touch sensing circuits 100_1 to 100_X in the touch controller IC 201.

Figure 18:
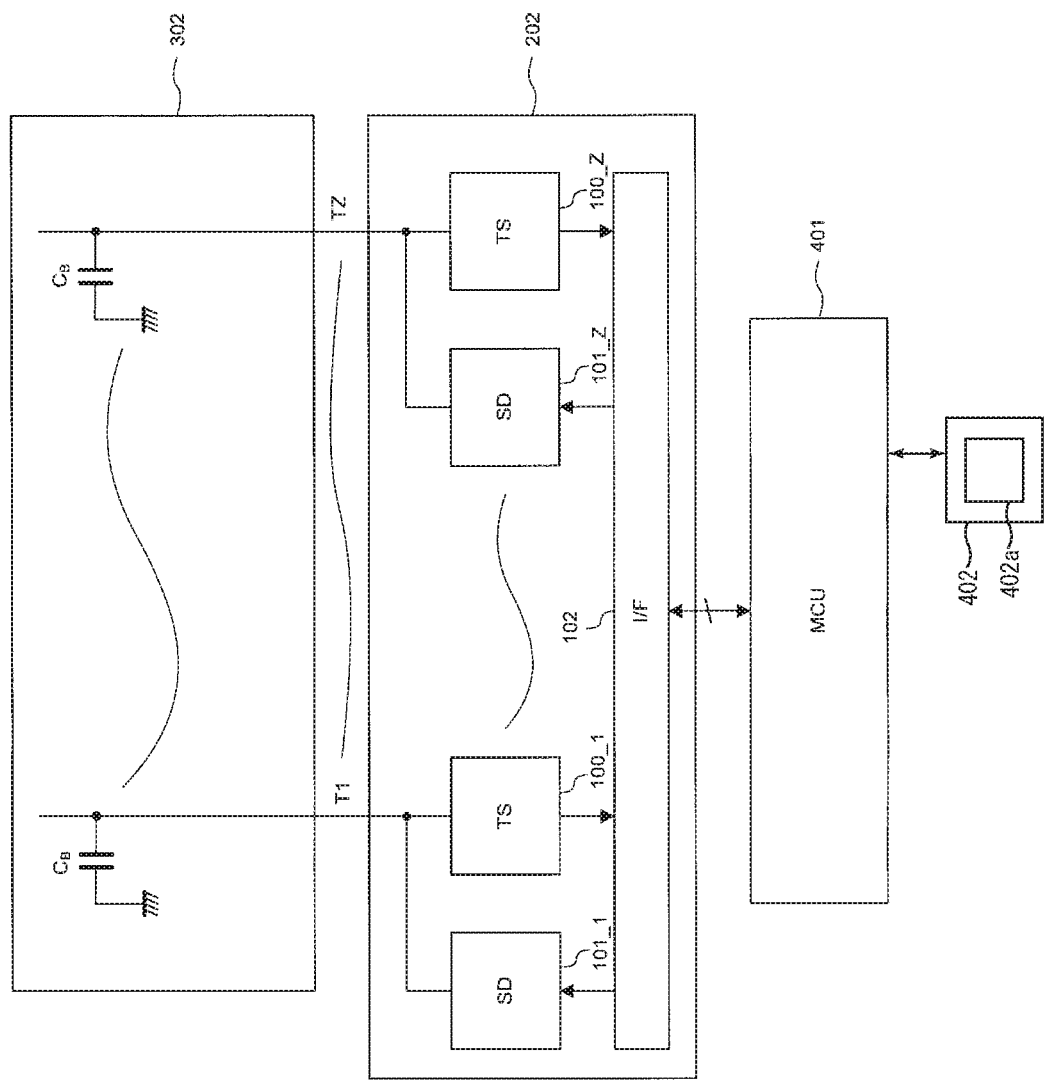
FIG. 18 is a block diagram schematically illustrating configuration examples of a touch panel and touch controller adapted to self-capacitance touch sensing.

FIG. 18 is a block diagram schematically illustrating a configuration example of a touch panel and a touch controller which are adapted to self-capacitance touch sensing.

In a touch panel adapted to self-capacitance touch sensing, which is denoted by numeral 302 in FIG. 18, sensor capacitors $C_B$ are respectively prepared for lines T1 to TZ to which sensing wave signals are supplied and on which response signals (sensor response) appear. The touch controller IC (integrated circuit) 202 includes sensing signal drive circuits 101_1 to 100_Z and touch sensing circuits 100_1 to 100_Z, which are respectively connected to the lines T1 to TZ. A microcontroller (MCU) 401, which is connected to the interface 102, controls the touch controller IC 202 and determines the touch coordinates on the basis of variations in the sensor capacitors $C_B$ measured by the touch sensing circuits 100_1 to 100_Z. In the self-capacitance touch sensing, the sensor capacitors $C_B$ are charged by the sensing signal drive circuits 101_1 to 101_Z via the lines T1 to TZ, and this causes discharging currents to appear on the same lines T1 to TZ depending on the capacitances of the sensor capacitors $C_B$. The touch sensing circuits 100_1 to 100_Z measure the current levels of the discharging currents. Since the current level of a response signal varies depending on variations in the capacitance of the corresponding sensor capacitor $C_B$, an increase in the capacitance of the sensor capacitor $C_B$ caused by an approach of a conductive object such as a finger of a user can be detected.

Although the above description is given with an assumption that the number of the sensor capacitors $C_B$ is equal to that of the touch sensing circuits for simplicity, the touch sensing operation may be time-divisionally performed by using a multiplexer or the like.

The sensing wave signals, one of which is also illustrated in FIGS. 5 and 9, are applied from the sensing signal drive circuits 101_1 to 101_Z to the sensor capacitors $C_B$ via the lines T1 to TZ. The conversion circuit (touch AFE) 1, the baseline vector manager circuit 2, the vector subtraction circuit 3 and the demultiplexer 4 are integrated in each of the touch sensing circuit 100_1 to 100_Z. The magnitude calculation circuits 6 and 7 illustrated in FIG. 9 may be also integrated in each of the touch sensing circuits 100_1 to 100_Z. The touch detection circuit 5 is implemented as a combination of the microcontroller 401 and a software program 402a stored in a storage device 402. The storage device 402 is a non-transitory tangible storage medium which stores therein the software program 402a. When the configuration of the touch sensing circuit of embodiment 1 (illustrated in FIG. 5) is used, the sensed results including vector information are transmitted to the microcontroller (MCU) 401 via the interface (I/F) 102. When the configuration of the touch sensing circuit of embodiment 2 (illustrated in FIG. 9) is used, the sensed results including scalar information are transmitted to the microcontroller (MCU) 401 via the interface (I/F) 102.

Some or all of the functions of the touch detection circuit 5 may be implemented as hardware in the touch sensing circuits 100_1 to 100_Z. In an alternative embodiment, some or all of the functions of the touch detection circuit 5 may be implemented as a single hardware circuit commonly used for the touch sensing circuits 100_1 to 100_Z in the touch controller IC 202. Some of the functions of the touch detection circuit 5 may be implemented as some of the functions of programs executed by a different processor communicably connected to the microcontroller (MCU) 401, such as an application processor provided in a system including the touch panel 301, the touch controller IC 202 and the microcontroller (MCU) 401.

Some of the functions of the baseline vector manager circuit 2 may be implemented as a software program executed by the microcontroller 401, the software program being stored in the storage device 402 in accompany with the functions of the touch detection circuit 5. In an alternative embodiment, some of the functions of the baseline vector manager circuit 2 may be implemented as a single hardware circuit commonly used for the touch sensing circuits 100_1 to 100_Z in the touch controller IC 202.

In both of mutual capacitance touch sensing and self-capacitance touch sensing, the touch sensing circuits 100 allow sensing an approach of a conductive object such as a finger of a user toward the sensor capacitances $C_B$ by measuring the response signals (sensor responses) generated by the sensor capacitors $C_B$ in response to the sensing wave signals applied to the sensor capacitors $C_B$.

Regardless of which of mutual capacitance touch sensing and self-capacitance touch sensing is used, the touch controller IC (201 and 202) may be formed on a single semiconductor substrate such as silicon by using a known manufacture process of CMOS LSIs (complementary metal-oxide-semiconductor field effect transistor large scale integrated circuit), but is not limited to this. The touch controller IC may be monolithically integrated on the same semiconductor chip as a display driver circuit. The touch controller IC may be flip-chip mounted on a glass substrate of a display touch panel. This effectively reduces the mounting and interconnection areas of the display touch panel, contributing bezel-narrowing.

FIG. 19 is an illustration illustrating the basic operation of the conversion circuit (touch AFE) 1 incorporated in the touch sensing circuit used in the above-described embodiments. For mutual capacitance touch sensing illustrated in FIG. 17, the sensing wave signals are sequentially applied to the sensing wave signal lines G1 to GY. As for the sensing wave signal line G1, a signal having a cycle of t0, that is, a fundamental frequency $f_k$ (=1/t0) is applied for one cycle period T of a predetermined duration. FIG. 19 illustrates a sensing wave signal applied to the sensing wave line G1 which is generated as sine wave, four cycles of which is included in one cycle period T. Note that this is merely one example. The number of cycles of the sensing wave signal included in one cycle period T may be arbitrarily selected. As for the waveform, the sensing wave signal may be trapezoidal wave, rectangular wave, triangular wave or other waveforms, other than sine wave and cosine wave. In this example, the response signal (sensor response) also has the same fundamental frequency $f_k$. The waveform of the sensing wave signal may be adjusted so that the response signal rather than the sensing wave signal is generated as sine or cosine wave.

In one embodiment, the conversion circuit (touch AFE) 1 includes an A/D conversion circuit and a Fourier transform circuit, for example. The A/D conversion circuit performs sampling on the response signal (sensor response), which is input as an analog signal, and thereby converts the response signal into time-dependent digital response data R(0) to R(N). The A/D conversion circuit supplies the response data R(0) to R(N) to the Fourier conversion circuit. Discussed below is an example in which the sampling is performed N+1 times in one cycle period T. This implies that N+1 response data R(0) to R(N) defined in the time domain. The response data R(0) to R(N) are converted into frequency domain representations through a discrete Fourier transform by the Fourier transform circuit. As a result, response signal data F(0) to F(N) are obtained in the frequency domain.

The following are basic formulas of a discrete Fourier transform:

$$R(n) = \frac{1}{N} \sum_{k=0}^{N-1} F_k \exp\left(j\frac{2\pi kn}{N}\right) \quad \text{[Formula 1]}$$

$$= \frac{1}{N} \sum_{k=0}^{N-1} a_k \cos\left(\frac{2\pi kn}{N}\right) + jb_k \sin\left(\frac{2\pi kn}{N}\right)$$

$$F(f) = \sum_{n=0}^{N-1} R(n) \exp(-j2\pi fn) \quad \text{[Formula 2]}$$

$$= \sum_{n=0}^{N-1} R(n)\{\cos(2\pi fn) - j\sin(2\pi fn)\}$$

$$= R(0)\cos(0) + R(1)\cos(2\pi f) + R(2)\cos(4\pi f) +$$
$$R(3)\cos(6\pi f) + \ldots + R(N-1)\cos(2\pi(N-1)f) -$$
$$j\{R(0)\sin(0) + R(1)\sin(2\pi f) + R(2)\sin(4\pi f) +$$
$$R(3)\sin(6\pi f) + \ldots + R(N-1)\sin(2\pi(N-1)f)\}$$

-continued $$F(f_k) = R(0)\cos(0) + R(1)\cos\left(\frac{2\pi}{8}\right) + R(2)\cos\left(\frac{4\pi}{8}\right) + \quad \text{[Formula 3]}$$
$$R(3)\cos\left(\frac{6\pi}{8}\right) + \ldots + R(31)\cos\left(\frac{2\pi \times 31}{8}\right) -$$
$$j\left\{R(0)\sin(0) + R(1)\sin\left(\frac{2\pi}{8}\right) + R(2)\sin\left(\frac{4\pi}{8}\right) + \right.$$
$$\left. R(3)\sin\left(\frac{6\pi}{8}\right) + \ldots + R(31)\sin\left(\frac{2\pi \times 31}{8}\right)\right\}$$

Formula 1 describes associations of the frequency domain data F(0) to F(N) with the time domain data R(0) to R(N). Formula 2 is obtained by rewriting formula 1 in a form suitable for calculating the frequency domain data F(0) to F(N) from the time domain data R(0) to R(N). When four cycles of a signal of a fundamental frequency $f_k$ (=1/t0) is included in one cycle period T as illustrated in FIG. 14, the signal component $F(f_k)$ of the fundamental frequency $f_k$ in the frequency domain is represented as formula 3. As thus described, when the calculation is limitedly performed on the component of the fundamental frequency $f_k$, not performed on all the frequency components of the response signal, this largely reduces the calculation amount, and effectively reduces the circuit size, compared with the case when a fast Fourier transform circuit is used, for example. It should be noted that the calculation of the frequency domain representation is not necessarily limited to the fundamental frequency $f_k$; the frequency domain representations of the second and third harmonic components as well as the fundamental frequency $f_k$ may be calculated. In an alternative embodiment, a frequency domain representation of a different characteristic frequency component(s) may be calculated.

As understood from formula 3, the response signal data F(0) to F(N) in the frequency domain are represented by complex numbers. Accordingly, the response signal data F(0) to F(N) are represented as vectors in a two-dimensional complex frequency space defined with a real number axis and an imaginary number axis. The vectors thus defined in the two-dimensional complex frequency space are the response signal vectors (sensed vector) S=(Sx0, Sx1).

Although the above-described embodiments recite that the discrete Fourier transform is achieved by hardware, the discrete Fourier transform may be implemented with software. For example, in one embodiment, the touch sensing circuits 100_1 to 100_X illustrated in FIG. 17 and the touch sensing circuits 100_1 to 100_Z illustrated in FIG. 18 may be configured to perform only a simple A/D conversion. In this case, the response signal data R(0) to R(N) in the time domain may be transmitted to the microcontroller (MCU) 401 to perform signal processing including a discrete Fourier transform and other processing with software. In an alternative embodiment, a processor other than the microcontroller 401 may be incorporated in the touch controller IC 201 or 202 to perform signal processing including a discrete Fourier transform and other processing with software.

Although specific embodiments have been described in detail, the present invention must not be construed as being limited to the above-described embodiments. It would be apparent that the present invention may be implemented with various modifications without departing the scope described below.

For example, the definition of blocks in the block diagrams should be understood as mere examples. A person skilled in the art would appreciate various modifications are possible; for example, some or all of the functions of a certain block may be achieved by a different block which achieves other functions.

What is claimed is:

1. A circuit for sensing an approach of an object towards a sensor, comprising:
a conversion circuit configured to:
receive a sensor response signal generated by a sensor capacitor in response to a sensing wave signal;
convert the sensor response signal into a frequency domain representation; and
calculate a response signal vector for a frequency component of the sensing wave signal;
a touch sensing circuit, coupled to the conversion circuit, comprising:
a baseline vector manager circuit configured to hold a baseline vector;
a vector subtraction circuit configured to receive the response signal vector and calculate a delta vector, the delta vector comprising a vector difference between the response signal vector and the baseline vector; and
a touch detection circuit, coupled to the touch sensing circuit, configured to detect an approach of a conductive object towards the sensor capacitor based on the delta vector.

2. The circuit according to claim 1, further comprising a demultiplexer configured to supply a selected one of the response signal vector and the delta vector to the touch detection circuit.

3. The circuit according to claim 1, further comprising:
a first magnitude calculation circuit configured to calculate a response signal scalar value corresponding to a magnitude of the response signal vector;
a second magnitude calculation circuit configured to calculate a signal difference scalar value corresponding to a magnitude of the delta vector, and
a demultiplexer configured to supply a selected one of the response signal scalar value and the signal difference scalar value to the touch detection circuit.

4. The circuit according to claim 1, wherein the touch detection circuit is further configured to:
store baseline vector area data indicating the baseline vector area in a two-dimensional space in which the frequency domain representation is defined and stores touch sensed area data indicating the touch sensed area in the two-dimensional space, and
determine that the conductive object approaches the sensor capacitor when an end point of the delta vector is positioned in the touch sensed area in the two-dimensional space with the initial point of the delta vector defined at a position corresponding to the baseline vector in the baseline vector area.

5. The circuit according to claim 4,
wherein the baseline vector area is defined as a circular area, and
wherein the touch sensed area is defined with a range of:
a distance from a center of the baseline vector area, and
an azimuth from a reference direction defined in the two-dimensional space.

6. The circuit according to claim 1, further comprising:
a sensing wave signal drive circuit configured to supply the sensing wave signal,
wherein a fundamental frequency of the sensing wave signal is higher than an inverse of a number equal to three times the value of a charging and discharging time constant of the sensor capacitor.

7. The circuit according to claim 1, wherein the touch sensing circuit and the conversion circuit are integrated within a same semiconductor substrate.

8. The circuit according to claim 7, wherein the touch detection circuit is also integrated within the same semiconductor substrate.

9. A non-transitory tangible storage medium having a touch sensing program stored thereon for detecting an approach of a conductive object towards a sensor capacitor, the touch sensing program, when executed, causing a processor to:
receive a sensor response signal from a sensor capacitor, the sensor response signal generated in response to a sensing wave signal applied to the sensor capacitor, and convert the sensor response signal into a frequency domain representation;
calculate a delta vector by subtracting a baseline vector from a response signal vector; and
detect the approach of the conductive object towards the sensor capacitor based on the calculated delta vector.

10. The storage medium according to claim 9, wherein to detect the approach of the conductive object further includes to:
select one of the delta vector and the response signal vector; and
detect the approach of the conductive object towards the sensor capacitor based on the selected one of the delta vector and the response signal vector.

11. The storage medium according to claim 9, wherein the touch sensing program, when executed, further causes the processor to:
calculate a response signal scalar value corresponding to a magnitude of the response signal vector;
calculate a signal difference scalar value corresponding to a magnitude of the delta vector; and
select one of the response signal scalar value and the signal difference scalar value,
wherein the approach of the conductive object towards the sensor capacitor is detected based on the selected one of the response signal scalar value and the signal difference scalar value.

12. The storage medium according to claim 9, wherein to detect the approach of the conductive object further includes to:
store:
baseline vector area data, indicating a baseline vector area in a two-dimensional space in which the frequency domain representation is defined, and touch sensed area data indicating a touch sensed area in the two-dimensional space, and
determine that the conductive object is approaching the sensor capacitor when an end point of the delta vector is positioned in the touch sensed area in the two-dimensional space with an initial point of the delta vector defined at a position corresponding to the baseline vector in the baseline vector area.

13. The storage medium according to claim 12, wherein the baseline vector area is defined as a circular area, and wherein the touch sensed area is defined with a range of:
a distance from a center of the baseline vector area and an azimuth from a reference direction defined in the two-dimensional space.

14. The storage medium according to claim 9, wherein a fundamental frequency of the sensing wave signal is higher than an inverse of a number equal to three times the value of a charging and discharging time constant of the sensor capacitor.

15. A method for sensing an approach of a conductive object towards a sensor capacitor comprising:
- receiving a sensor response signal generated by a sensor capacitor in response to a sensing wave signal applied to the sensor capacitor;
- converting the response signal into a frequency domain representation and calculating a response signal vector for a frequency component of the sensing wave signal;
- calculating a delta vector, the delta vector comprising a vector difference between a response signal vector and a baseline vector; and
- detecting the approach of the conductive object towards the sensor capacitor based on the calculated delta vector.

16. The method according to claim 15, wherein detecting the approach of the conductive object towards the sensor capacitor is based on the response signal vector.

17. The method according to claim 15, further comprising:
- calculating a response signal scalar value corresponding to a magnitude of the response signal vector;
- calculating a signal difference scalar value corresponding to a magnitude of the delta vector; and
- selecting one of the response signal scalar value and the signal difference scalar value,
- wherein detecting the approach of the conductive object towards the sensor capacitor is performed in response to the selected one of the response signal scalar value and the signal difference scalar value.

18. The method according to claim 15, further comprising storing baseline vector area data indicating a baseline vector area, and touch sensed area data indicating a touch sensed area, in a two-dimensional space in which the frequency domain representation is defined, and
- wherein detecting the approach of the conductive object towards the sensor capacitor includes detecting when an end point of the delta vector is positioned in the touch sensed area in the two-dimensional space with an initial point of the delta vector defined at a position corresponding to the baseline vector in the baseline vector area.

19. The touch sensing method according to claim 18, wherein the baseline vector area is defined as a circular area, and wherein the touch sensed area is defined with a range of:
- a distance from a center of the baseline vector area, and
- an azimuth from a reference direction defined in the two-dimensional space.

20. The touch sensing method according to claim 15, wherein a fundamental frequency of the sensing wave signal is higher than an inverse of a number equal to three times the value of a charging and discharging time constant of the sensor capacitor.

* * * * *